United States Patent [19]
Miwa et al.

[11] Patent Number: 5,522,126
[45] Date of Patent: Jun. 4, 1996

[54] METHOD OF MANUFACTURING A COMPOSITE MAGNETIC HEAD

[75] Inventors: Tetsuo Miwa, Nishikasugai-gun; Masatomo Yamauchi, Haguri-gun; Soichiro Matsuzawa, Kuwana; Nobuhiro Terada, Kasugai, all of Japan

[73] Assignee: NGK Insulators, Ltd., Japan

[21] Appl. No.: 213,528

[22] Filed: Mar. 16, 1994

[30]  Foreign Application Priority Data

Mar. 26, 1993 [JP] Japan ................................ 5-068665
May 25, 1993 [JP] Japan ................................ 5-122791

[51] Int. Cl.⁶ ............................................. G11B 5/127
[52] U.S. Cl. ................... 29/603.21; 65/42; 156/292; 360/103; 360/125
[58] Field of Search .................... 29/603; 156/257, 156/292, 299, 325; 360/119, 103, 122, 125; 65/42, 43

[56] References Cited

U.S. PATENT DOCUMENTS

| | | | |
|---|---|---|---|
| 3,819,348 | 6/1974 | Murray | 65/42 X |
| 3,845,550 | 11/1974 | Gooch et al. | 29/603 |
| 3,943,624 | 3/1976 | Wank | 65/43 X |
| 3,983,622 | 10/1976 | Schneider et al. | 65/43 X |
| 4,182,643 | 1/1980 | Calderon et al. | 65/43 X |
| 5,177,654 | 1/1993 | Matsuzawa et al. | 360/103 |
| 5,208,965 | 5/1993 | Ozeki et al. | 29/603 |

FOREIGN PATENT DOCUMENTS

| | | | |
|---|---|---|---|
| 2-289910 | 11/1990 | Japan | 29/603 |
| 3-273520 | 12/1991 | Japan . | |

OTHER PUBLICATIONS

*Read–write performance of low L, Hybrid MIG head*, A. Nitta et al., Digests of the 16th Annual Conference on Magnetics in Japan 7PF-19 (1992).

Primary Examiner—S. Thomas Hughes
Attorney, Agent, or Firm—Parkhurst, Wendel & Burr

[57] ABSTRACT

A ferrite plate and a ceramic plate are joined to each other by a glass layer interposed therebetween. The ferrite plate and the ceramic plate thus joined to each other by the glass layer serve as a trailing core in the form of a composite for use in a magnetic head. Only the ferrite plate is exposed on a slidable surface to prevent the trailing core from being deformed or cracked. The trailing core has low inductance for high-density recording to prevent the magnetic head from causing recording/reading errors.

12 Claims, 27 Drawing Sheets

PRIOR ART

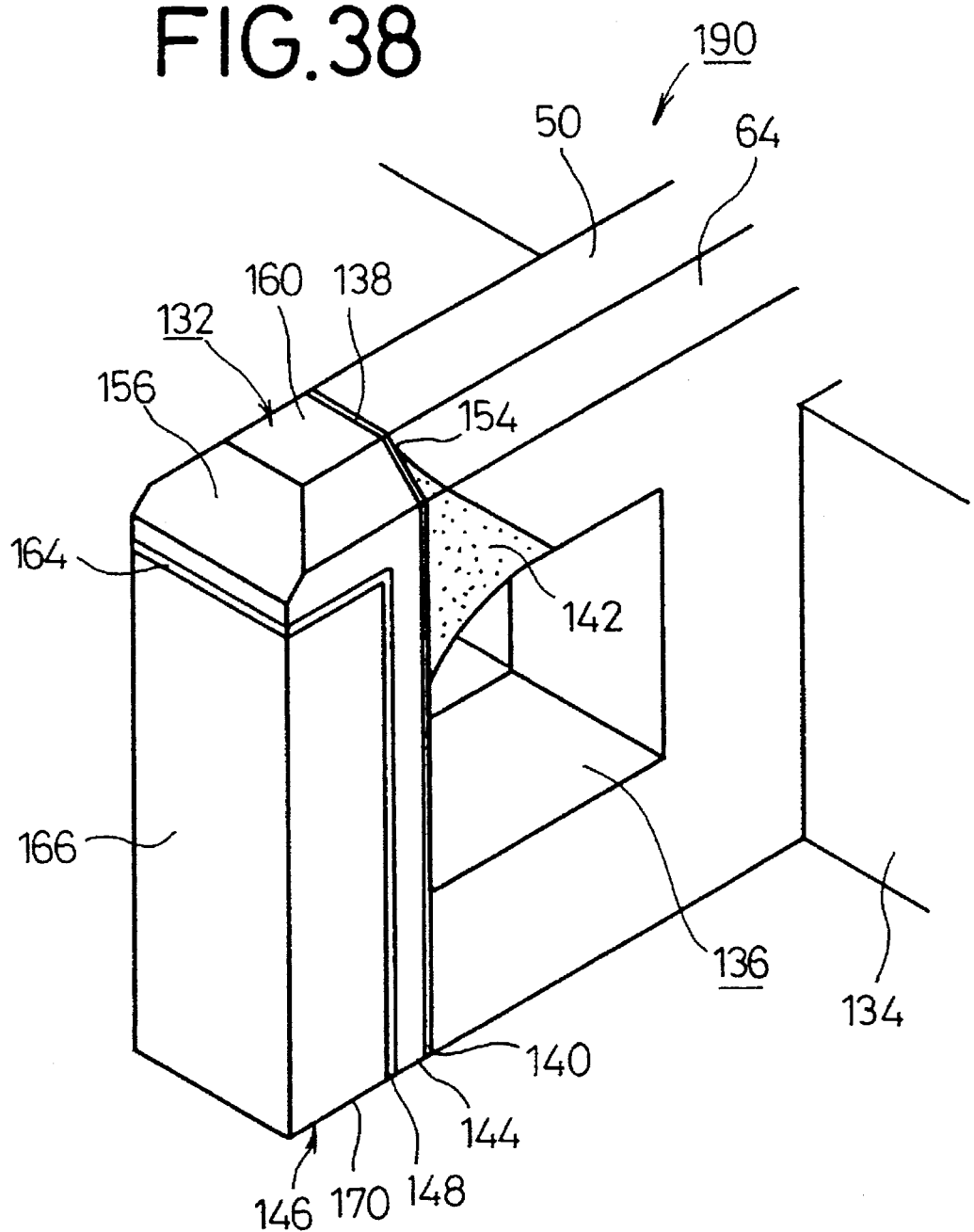

METHOD OF MANUFACTURING A COMPOSITE MAGNETIC HEAD

BACKGROUND OF THE INVENTION

1. Field of the Invention

The present invention relates to a composite magnetic head, a composite therefor, and a method of manufacturing such a composite magnetic head and a composite therefor, and more particularly to a composite magnetic head for use in a magnetic disk drive, a composite therefor, and method of manufacturing such a composite magnetic head and a composite therefor.

2. Description of the Related Art

It has been proposed to fabricate a magnetic head trailing core of a composite material comprising Mn—Zn ferrite and ceramics whose principal component is $CaTiO_3$ in order to reduce the inductance of the trailing core to render the magnetic head suitable for higher frequencies. FIG. 1 of the accompanying drawings is a perspective view of a composite magnetic head made of such a composite material. FIG. 2 of the accompanying drawings illustrates in perspective a core chip used in the composite magnetic head shown in FIG. 1.

As shown in FIG. 1, the composite magnetic head, generally denoted as 2, has a structure comprising integrally a slider body 4 having air bearings, and a core chip 6 serving as a recording/reproducing section for writing desired information on and reading desired information from a magnetic disk.

Specifically, the slider body 4 has air bearings 8, 10 on its upper surface which include leading ramps 12 respectively on their rear ends and trailing chamfers 14 respectively on their front ends. The slider body 4 also has a coil winding groove 16 defined in a front end thereof for housing a coil therein, and a core chip insertion groove 18 defined in a front end portion thereof and extending from the upper surface of the air bearing 8 to the lower surface of the slider body 4. The core chip 6 is inserted in the core chip insertion groove 18 and fixed in place by a glass body 20. The slider body 4 may be made of nonmagnetic ceramics of $CaTiO_3$ to prevent the recording/reproducing efficiency of the core from being lowered due to flux leakage.

As shown in FIG. 2, the core chip 6 comprises a trailing core 22 and a leading core 24. The leading core 24 has a C-shaped cross section and a coil winding groove 26 defined therein. The trailing core 22 has an I-shaped cross section with no coil winding groove. The C-shaped leading core 24 has upper and lower arms spaced from each other. The upper arm has a distal end cut off to define a magnetic gap 28 of a certain depth. The distal ends of the upper and lower arms of the leading core 24, and a side surface of the trailing core 22 are joined to each other through a gap glass layer 30, with the magnetic gap 28 defined therebetween. A space defined below the magnetic gap 28 between the leading core 24 and the trailing core 22 is filled up with an apex glass 32. The leading core 24 is made of Mn—Zn ferrite.

The trailing core 22 is made of a composite having a Mn—Zn ferrite segment 34, a $CaTiO_3$ segment 36, and a glass layer 38 which joins the segments 34, 36 to each other.

The trailing and leading cores 22, 24 jointly have a track forming region 40 defined as a vertical step in upper ends thereof, providing a track 42 of a predetermined width on one side of the upper ends of the trailing and leading cores 22, 24. The track 42 has a trailing chamfer 44 on the upper surface of a front end thereof and a leading chamfer 46 on the upper surface of a rear end thereof. The track 42 has an upper surface 48 positioned on the trailing core 22, and an upper surface 50 positioned on the leading core 24, the upper surfaces 48, 50 being slidable surfaces on which a magnetic disk slides.

There has been proposed a monolithic magnetic head as shown in FIG. 3 of the accompanying drawings, which includes a trailing core made of a composite comprising Mn—Zn ferrite and ceramics whose principal component is $CaTiO_3$ in order to reduce the inductance of the trailing core to render the magnetic head suitable for higher frequencies.

As shown in FIG. 3, the monolithic magnetic head, generally denoted at 52, has the trailing core 22 fixed to the front end of a leading core 24, which has air bearings 54, 56, 58.

Each of the air bearings 54, 56, 58 has a leading ramp 60 on its rear end. The leading core 24 has a central portion on which the air bearing 58 is disposed, the central portion having a front end 62 of a C-shaped cross section with a coil winding groove 26 defined therein. The trailing core 22, which is mounted on the front end 62, has an I-shaped cross section with no coil winding groove. An upper portion of the front end 62 is cut off to define a magnetic gap 28 of a certain depth. The distal ends of the upper and lower arms of the front end 62 of the leading core 24, and a side surface of the trailing core 22 are joined to each other through a gap glass layer 30, with the magnetic gap 28 being defined therebetween. A space defined below the magnetic gap 28 between the front end 62 of the leading core 24 and the trailing core 22 is filled up with an apex glass 32. The leading core 24 is made of Mn—Zn ferrite.

The trailing core 22 has a trailing chamfer 44 on the upper surface of a front end thereof. The trailing core 22 has an upper surface 48 and the air bearing 58 has an upper surface 50, with a track forming surface 64 defined on both side surfaces across the upper surfaces 48, 50. The upper surfaces 48, 50 are slidable surfaces on which a magnetic disk slides.

In each of the composite magnetic head 2 and the monolithic magnetic head 52, the trailing core 22 is made of a composite having a Mn—Zn ferrite segment 34, a $CaTiO_3$ segment 36, and a glass layer 38 which joins the segments 34, 36 to each other.

Therefore, the Mn—Zn ferrite segment 34 has a small thickness to reduce the inductance of the magnetic head core to render the magnetic head suitable for higher frequencies. Since the nonmagnetic $CaTiO_3$ segment 36 is joined to the Mn—Zn ferrite segment 34, the overall thickness of the trailing core 22 is kept large to maintain a desired mechanical strength even if though the Mn—Zn ferrite segment 34 is relatively thin.

However, since a boundary layer between the Mn—Zn ferrite segment 34 and the $CaTiO_3$ segment 36 is exposed on the sliding surface 48 and lies perpendicularly to the sliding surface 48, signals recorded on the magnetic disk are read by an edge 66 of the Mn—Zn ferrite segment 34 near the boundary layer, as well as by the magnetic gap 28, resulting in a readout error.

To eliminate such a readout error, it may be possible to extend the trailing chamfer 44 toward the Mn—Zn ferrite segment 34 to make the edge 66 blunt. However, the Mn—Zn ferrite segment 34 is so thin that the magnetic gap 28 tends to be broken when the trailing core 22 is chamfered to produce the trailing chamfer 44 that extends to the Mn—Zn ferrite segment 34.

If the slider body 4 shown in FIG. 1 is made of $CaTiO_3$, then since $CaTiO_3$ has a large coefficient of friction against the magnetic disk surface, the slider body 4 and/or the magnetic disk is liable to be damaged when the slider body 4 slidingly contacts the magnetic disk surface. One solution has been to coat a nonmagnetic ceramics plate with glass by sputtering or the like, holding an Mn—Zn ferrite plate against the glass-coated nonmagnetic ceramics plate, and pressing them against each other with heat, for thereby making at least a disk sliding portion of the slider body, of Mn—Zn ferrite (see Japanese laid-open patent publication No. 3-273520).

The glass coated by sputtering or the like forms a very thin film, and hence fails to bear a thermal stress developed when the Mn—Zn ferrite segment and the nonmagnetic ceramics segment are joined, due to the difference between their coefficients of thermal expansion. Consequently, the composite made of Mn—Zn ferrite and the nonmagnetic ceramics tends to be curved or cracked.

SUMMARY OF THE INVENTION

It is therefore an object of the present invention to provide a composite magnetic head, a composite for such a composite magnetic head, and a method of manufacturing such a composite magnetic head, wherein the composite magnetic head includes a magnetic head core having a low inductance to make the magnetic head suitable for high frequencies, and which prevents readout errors from occurring.

Another object of the present invention is to provide a composite magnetic head, a composite for such a composite magnetic head, and a method of manufacturing such a composite magnetic head, wherein the composite magnetic head is free of curvature or a crack that would otherwise be caused when segments of Mn—Zn ferrite and nonmagnetic ceramics are joined.

Still another object of the present invention is to provide a composite magnetic head, a composite for such a composite magnetic head, and a method of manufacturing such a composite magnetic head, wherein the composite magnetic head includes a trailing core made of a composite of magnetic and nonmagnetic segments, the magnetic segment has a reduced thickness to reduce the inductance of a magnetic core including the trailing core therein, so as to render the magnetic head suitable for higher frequencies, and the trailing core as a whole has a desired overall thickness to maintain a mechanical strength in spite of a reduced thickness of the magnetic segment.

Yet still another object of the present invention is to provide a composite magnetic head, a composite for such a composite magnetic head, and a method of manufacturing such a composite magnetic head, wherein the composite magnetic head includes a trailing core made of a composite including magnetic and nonmagnetic segments with a boundary layer therebetween, an end face of the boundary layer which is closer to a slidable surface for a magnetic disk of the trailing core is positioned at a side surface other than the slidable surface, so that the end face of the boundary layer is not exposed on the slidable surface, with only the magnetic segment exposed on the slidable surface, to thereby prevent readout errors from occurring which would otherwise be caused when signals on the magnetic disk are read by an edge of the boundary layer.

A further object of the present invention is to provide a composite magnetic head, a composite for such a composite magnetic head, and a method of manufacturing such a composite magnetic head, wherein the composite magnetic head includes a trailing core made of a composite including magnetic and nonmagnetic segments with a boundary layer therebetween, an end face of the boundary layer which is closer to a slidable surface for a magnetic disk of the trailing core is positioned at a side surface other than the slidable surface, so that the end face of the boundary layer is not exposed on the slidable surface, with only the magnetic segment exposed on the slidable surface, the magnetic segment of the trailing core has a trailing chamfer positioned remote from a magnetic gap so that the trailing chamfer can be produced without damaging the magnetic gap, and the trailing chamfer is shaped to make an edge of the magnetic segment on the sliding surface blunt, to thereby prevent readout errors from occurring which would otherwise be caused when signals on the magnetic disk are read by an edge of the boundary layer and the edge of the magnetic segment on the sliding surface.

A still further object of the present invention is to provide a composite magnetic head, a composite for such a composite magnetic head, and a method of manufacturing such a composite magnetic head, wherein the composite magnetic head includes a trailing core made of a composite including magnetic and nonmagnetic segments with a boundary layer therebetween, an end face of the boundary layer which is closer to a slidable surface for a magnetic disk of the trailing core is positioned at a side surface other than the slidable surface, so that the end face of the boundary layer is not exposed on the slidable surface, with only the magnetic segment exposed on the slidable surface, the end face of the boundary layer which is closer to the slidable surface is positioned other than a track forming region of the trailing core, so that when a track is formed, only the magnetic segment is machined whereas the boundary layer of the composite is not machined, to thereby allow the track to be produced easily with high accuracy without cracks or chips.

According to the present invention, there is provided a method of manufacturing a composite for a magnetic head, the composite including a first segment of Mn—Zn ferrite, a second segment of nonmagnetic ceramics, and a glass layer which joins the first and second segments to each other, the method comprising steps of: defining a groove in a surface of at least the second segment, the groove extending from one end to the other of the second segment, for receiving therein the glass layer; holding the surfaces of the first and second segments against each other, at least one of which has the groove defined therein; placing glass stuff at one end of the groove; and softening the glass stuff to cause the same to flow into the groove from the one end thereof, thereby forming the glass layer in the groove.

According to the present invention, there is also provided a method of manufacturing a composite for a magnetic head, the composite including a first segment of Mn— Zn ferrite, a second segment of nonmagnetic ceramics, and a glass layer which joins the first and second segments to each other, the method comprising steps of: placing spacers between the first and second segments, thereby creating a space between the first and second segments; placing a glass stuff on one end of the space; and softening said glass stuff to cause the same to flow into the space from the one end thereof, thereby forming the glass layer in the space.

According to the present invention, there is further provided a magnetic head comprising a trailing core, and a leading core joined to said trailing core across a magnetic gap, wherein the trailing core is made of a composite including a magnetic segment and a nonmagnetic segment and has a slidable surface on which a recording medium slides, the magnetic and nonmagnetic segments have a boundary layer therebetween, and the boundary layer has an end face, which is closer to the slidable surface, positioned at a side surface of the trailing core other than the slidable surface, so that the trailing core has only the magnetic segment exposed on the slidable surface.

According to the present invention, there is further provided a method of manufacturing a magnetic head, comprising the steps of: defining a groove in one surface of a first segment of a magnetic material; placing a second segment of a nonmagnetic material in the groove, the second segment having side and bottom surfaces spaced respectively from side and bottom surfaces of the groove; flowing glass into a space between the surfaces of the groove and the second segment for thereby joining the first and second segments with the glass, to produce a composite including the first segment and the second segment placed in the groove and joined to the first segment; and joining a leading core segment to an opposite surface of the first segment remote from the one surface thereof.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 38 is a perspective view of a monolithic magnetic head according to a yet still further embodiment of the present invention.

DETAILED DESCRIPTION OF THE PREFERRED EMBODIMENTS

FIGS. 4 through 7 show, in general, a method of manufacturing a composite magnetic head for use in a magnetic disk drive, for example.

Figure 4:
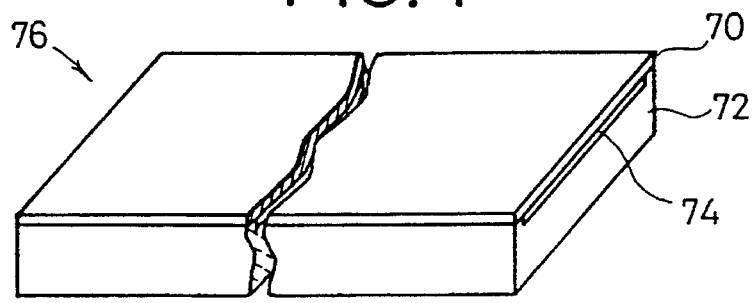
FIGS. 4 through 7 are fragmentary perspective views illustrative of a method of manufacturing a composite magnetic head.
Figure 5:
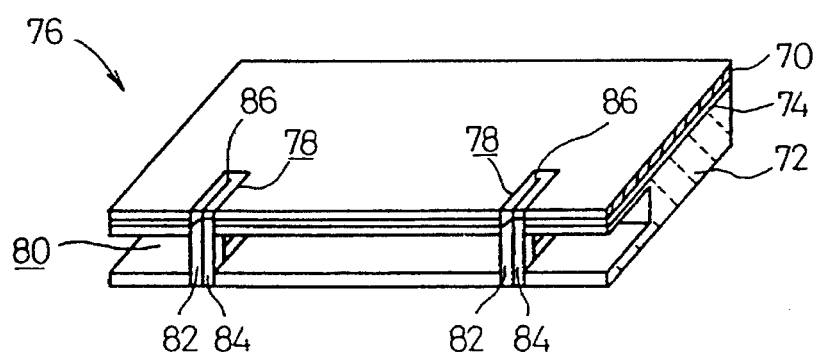

As shown in FIG. 4, a ferrite plate 70 made of monocrystalline Mn—Zn and a ceramics plate 72 made of nonmagnetic ceramics are integrally joined to each other by a glass layer 74 having a high melting point, thus producing a slider body substrate 76. Then, as shown in FIG. 5, core chip insertion grooves 78 and a coil winding groove 80 are defined in the slider body substrate 76, and core chips 82 together with spacers 84 of nonmagnetic material are inserted into the respective core chip insertion grooves 78 and fixed in place therein by glass bodies 86 of a low melting point.

Figure 6:
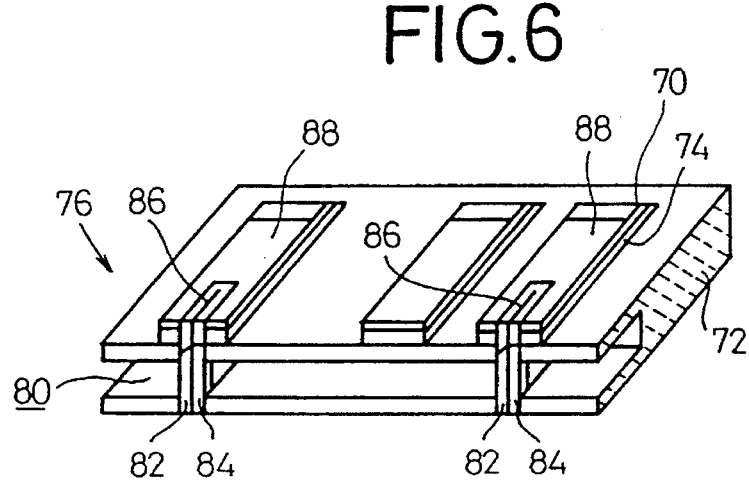

Thereafter, the ferrite plate 70 of the slider body substrate 76 is ground to a certain depth and leading ramps are produced thereon. The ferrite plate 70 is then masked in a predetermined pattern, and selectively etched to form air bearings 88, as shown in FIG. 6.

Figure 7:
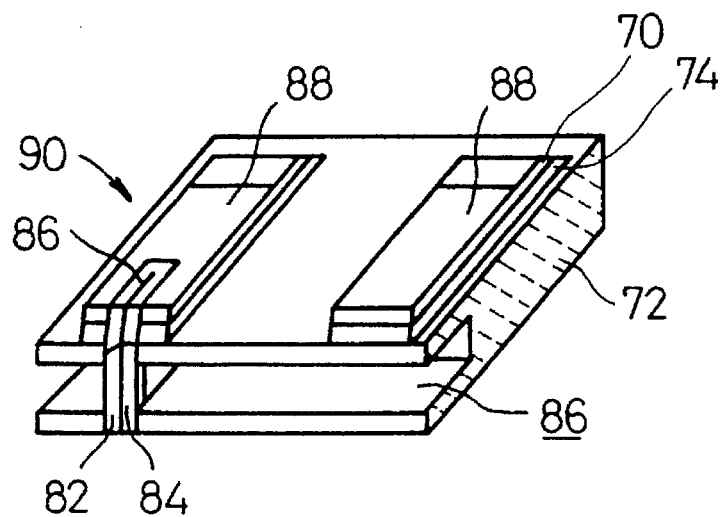

Finally, the slider body substrate 76 is chamfered and cut into the size of a core slider 90 as shown in FIG. 7.

Figure 8:
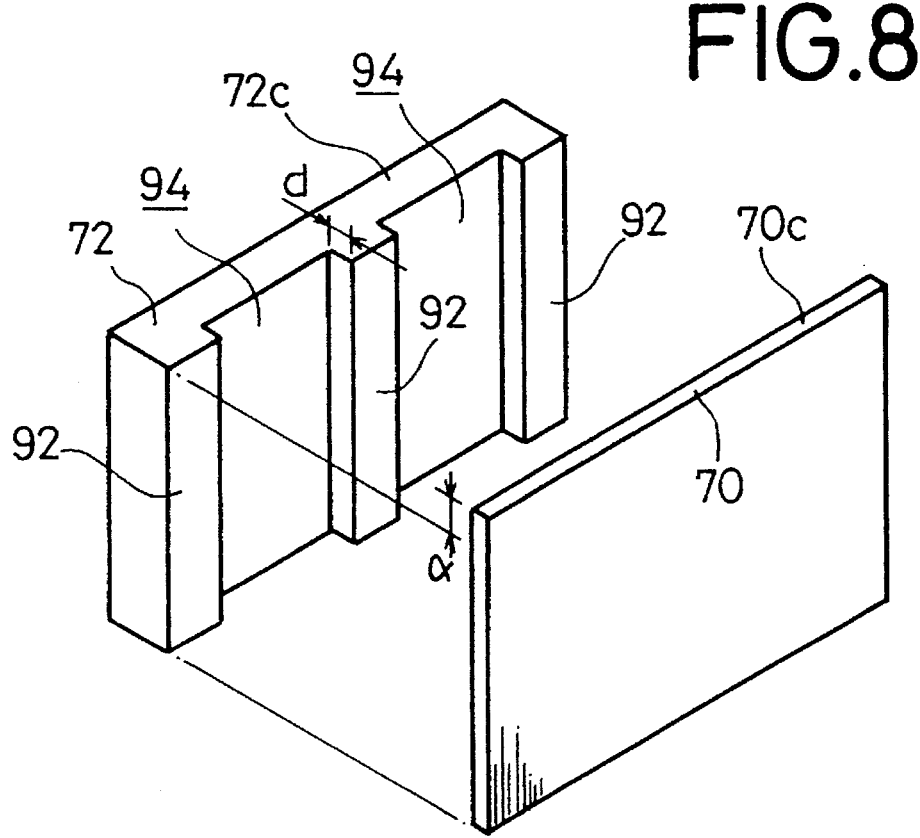
FIGS. 8 through 11 are fragmentary perspective views illustrative of a method of manufacturing a composite for a composite magnetic head according to an embodiment of the present invention.

In the preferred embodiment of the present invention, the ceramics plate 72 is made of nonmagnetic ceramics composed mainly of $CaTiO_3$. As shown in FIG. 8, the ceramics plate 72 has a plurality of parallel spaced ridges 92 on a joint surface or a boundary layer thereof which include ridges on respective opposite ends thereof. The spaced ridges 92 define grooves 94 therebetween. Each of the grooves 94 has a depth d ranging from 10 μm to 50 μm, preferably from 15 μm to 40 μm. The ceramics plate 72 is of essentially the same shape as the ferrite plate 70, but is shorter than the ferrite plate 70 by a length α.

Figure 9:
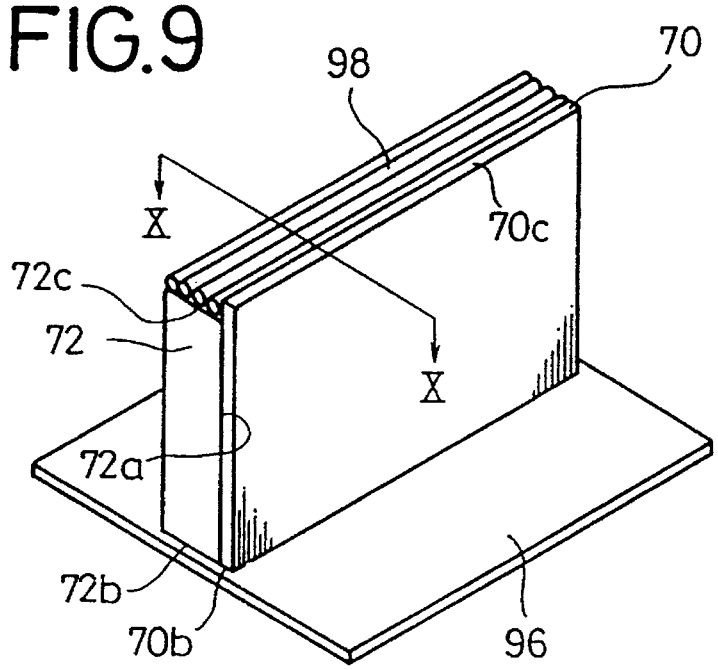
Figure 10:
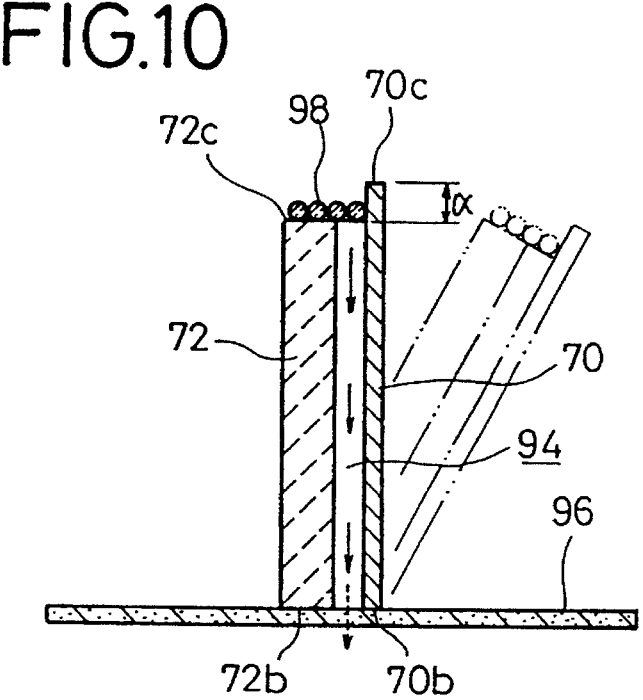

As shown in FIGS. 9 and 10, the ferrite plate 70 is held against the joint surface or the boundary layer 72a of the ceramics plate 72, and the ferrite plate 70 and the ceramic plates 72 have aligned lower ends 70b, 72b, respectively, placed on a porous plate 96 as of artificial mica. Therefore, the ferrite plate 70 has an upper end 70c positioned higher than the upper end 72c of the ceramics plate 72 by the length α. Then, fiberglass 98 made of glass 74 having a high melting point (whose softening temperature ranges from 600° C. to 670° C.) are placed on the upper surface of the ceramics plate 72 over the grooves 94.

Figure 11:
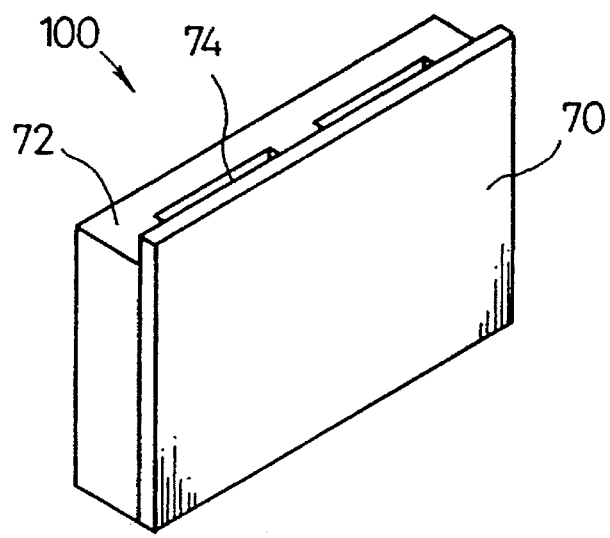

Thereafter, the entire assembly is heated to a temperature of 910° C. The glass 74 of the fiberglass 98 is softened, and flows into the grooves 94 as indicated by the solid-line arrows in FIG. 10. The softened glass 74 that has reached the lower ends of the grooves 94 is borne by the porous plate 96, and only air bubbles contained in the softened glass 74 enter the porous plate 96 as indicated by the broken-line arrow in FIG. 10. Consequently, the air bubbles contained in the softened glass 74 are effectively removed therefrom. Then, the assembly starts being cooled, and the softened glass 74 is solidified in the temperature range from 600° C. to 670° C., thus joining the ferrite plate 70 and the ceramics plate 72. Finally, the porous plate 96 that has been joined to the ferrite plate 70 and the ceramics plate 72 by the glass 74 is cut off, thereby producing a composite 100 shown in FIG. 11.

In the formation of the composite 100, thermal stresses are developed in the ferrite plate 70 or the ceramics plate 72 due to the difference between the coefficients of thermal expansion of the ferrite plate 70 and the ceramics plate 72. Since, however, the glass 74 that entered the grooves 94 has been formed into a glass layer having a sufficient thickness (=depth d), it lessens the generated thermal stresses, thus preventing the ferrite plate 70 and the ceramics plate 72 from being curved or cracked. If the depth d of the grooves 94 were smaller than 10 μm, then the glass 74 would not flow into the grooves 94. If the depth d of the grooves 94 were larger than 50 μm, then when the joined composite 100 is cut off, it would exert too large a cutting resistance, tending to develop cracks in the ferrite plate 70.

Since the upper end 70c of the ferrite plate 70 is higher than the upper end 72c of the ceramics plate 72 by the length α, as shown in FIG. 10, the fiberglass 72 are effectively supported by the ferrite plate 70 when the ferrite plate 70 and the ceramics plate 72 are tilted on the porous plate 96 as indicated by the two-dot-and-dash lines in FIG. 10.

Inasmuch as the fiberglass 98 on the upper end 72c of the ceramics plate 72 are lower than the upper end 70c of the ferrite plate 70 as shown in FIG. 10, the softened glass 74 is not attached to the upper end 70c of the ferrite plate 70, thereby preventing the ferrite plate 70 from being cracked.

The ferrite plate 70 and the ceramics plate 72 are joined to each other by the glass 74 having a high melting point whose softening temperature ranges from 600° C. to 670° C. Consequently, even when the core chips 82 together with spacers 84 (see FIG. 5) are fixed in place by the glass bodies 86 of a low melting point, the glass 74 is not softened, and the ferrite plate 70 and the ceramics plate 72 which have been joined thereby are not dislocated.

Figure 12:
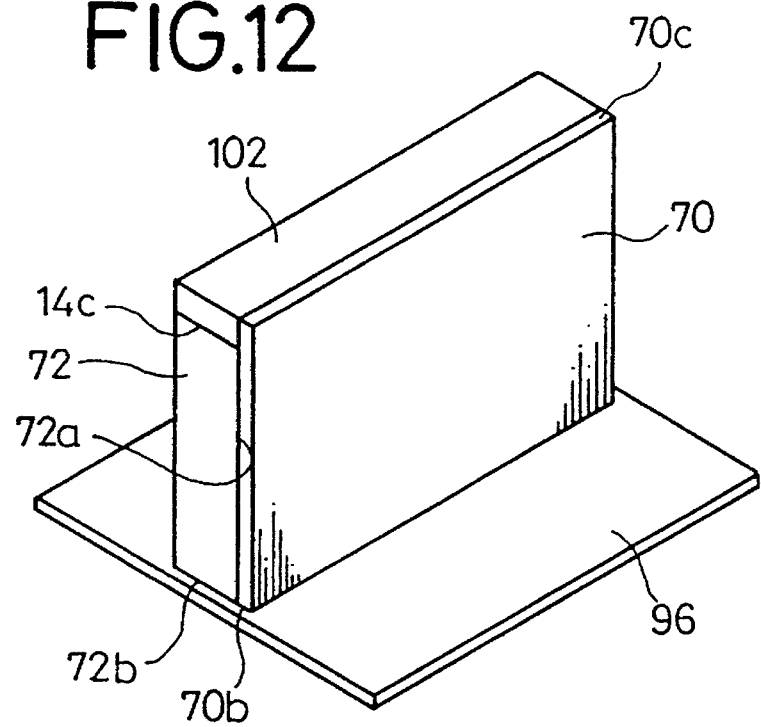
FIG. 12 is a fragmentary perspective view showing a modified method of manufacturing a composite.

While the fiberglass 98 is employed in the embodiment described above, a plate 102 made of glass having a high melting point may be employed as shown in FIG. 12. Furthermore, the ridges 92 and the grooves 94 may be provided on the ferrite plate 70 rather than the ceramics plate 72.

Instead of the ridges 92 on the ceramics plate 72, a plurality of spacers 104 (see FIG. 13) of the same material as the ceramics plate 72 may be employed for use between the ceramics plate 72 and the ferrite plate 70. In this modification, since the ceramics plate 72 is of a simple flat shape, the composite can be manufactured efficiently. The spacers 104 may be made of a material different from the ceramics plate 72.

A method of manufacturing a composite for a composite magnetic head according to another embodiment of the present invention will be described below with reference to FIGS. 14 and 15. In this embodiment, a ceramics plate 72 is put between two ferrite plates 70.

Each of the ferrite plates 70 is identical to the ferrite plate 70 shown in FIGS. 8 through 13.

Figure 14:
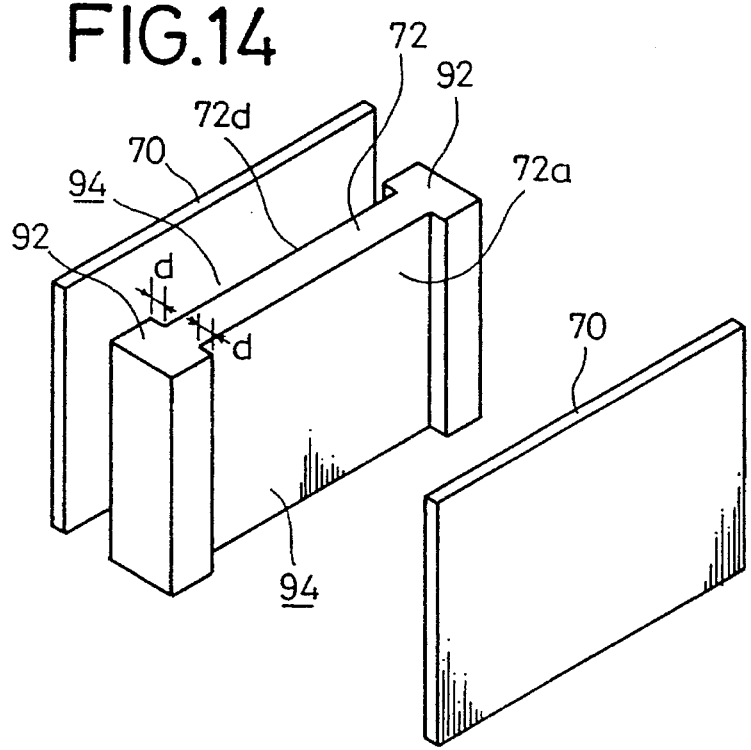
FIGS. 14 and 15 are fragmentary perspective views illustrative of a method of manufacturing a composite for a composite magnetic head according to another embodiment of the present invention.

As shown in FIG. 14, the ceramics plate 72 has opposite joint surfaces 72a, 72d each having parallel spaced ridges 92 disposed respectively on its opposite ends with a groove 94 defined therebetween.

Figure 15:
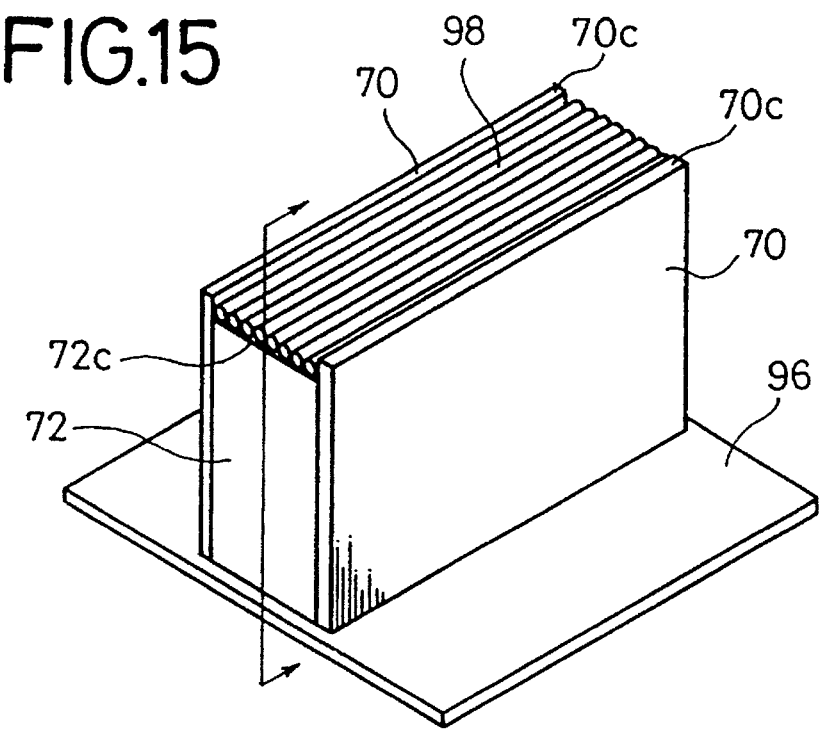

As shown in FIG. 15, the ferrite plates 70 are held symmetrically against the respective opposite joint surfaces 72a, 72d of the ceramics plate 72, and the ferrite plates 70 and the ceramics plate 72 are placed on a porous plate 96 as of artificial mica. Then, fiberglass 98 of glass 74 having a high melting point is put on the upper end of the ceramics plate 72. Thereafter, the glass 74 of the fiberglass 98 is softened, and flows into the grooves 94. The softened glass 74 that has entered the grooves 94 is then solidified into glass layers, thereby joining the ferrite plates 70 and the ceramics plate 72 to each other.

Each of the solidified glass layers in the grooves 94 has a thickness d ranging from 10 μm to 50 μm. These glass layers are effective in reducing thermal stresses developed in the ferrite plates 70 or the ceramics plate 72. Since the ferrite plates 70 are symmetrically positioned one on each side of the ceramics plate 72, any cracks or deformation of the ferrite plates 70 can be reduced when they are subjected to thermal stresses.

The ferrite plates 70 has upper ends 70c higher than the upper end 72c of the ceramics plate 72. Therefore, the fiberglass 98 placed on the upper end of the ceramics plate 72 before it is softened is stably supported in position.

The ferrite plates 70 and the ceramics plate 72 which are thus joined to each other as a composite is thereafter cut into halves along the arrows shown in FIG. 15, thus producing two composite assemblies. The method shown in FIGS. 14 and 15 is therefore effective in increasing the production efficiency.

Figure 13:
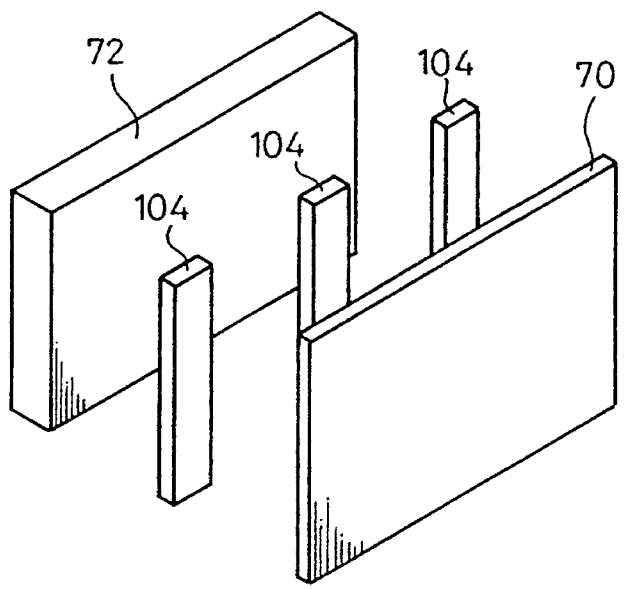
FIG. 13 is a fragmentary perspective view showing another modified method of manufacturing a composite.

The ridges 92 shown in FIG. 14 may be replaced with separate spacers as with the modification shown in FIG. 13.

Any of the methods described above may be employed as part of a method of manufacturing a core chip for high-density recording as shown in FIGS. 16 through 19. Such a method of manufacturing a core chip for high-density recording will be described below.

Figure 16:
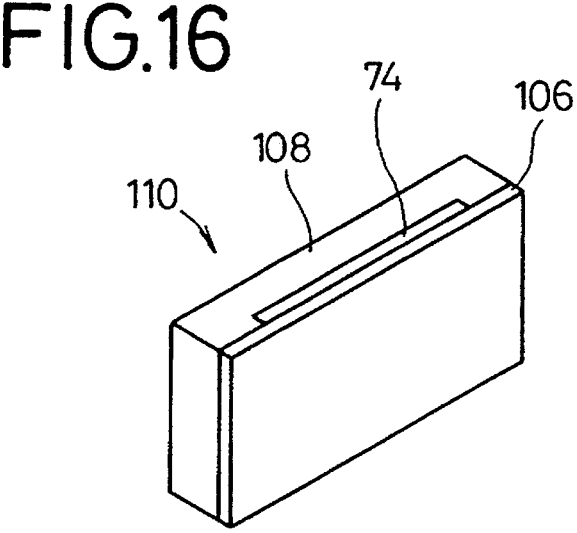
FIGS. 16 through 18 are fragmentary perspective views illustrative of a method of manufacturing a core chip.

First, as shown in FIG. 16, a ferrite plate 106 made of Mn—Zn ferrite and a nonmagnetic ceramics plate 108 made of nonmagnetic ceramics, e.g., $CaTiO_3$, are joined to each other by a glass layer 74 having a high melting point (whose softening temperature ranges from 600° C. to 670° C.) according to one of the methods described above, thus producing a composite 110.

Figure 17:
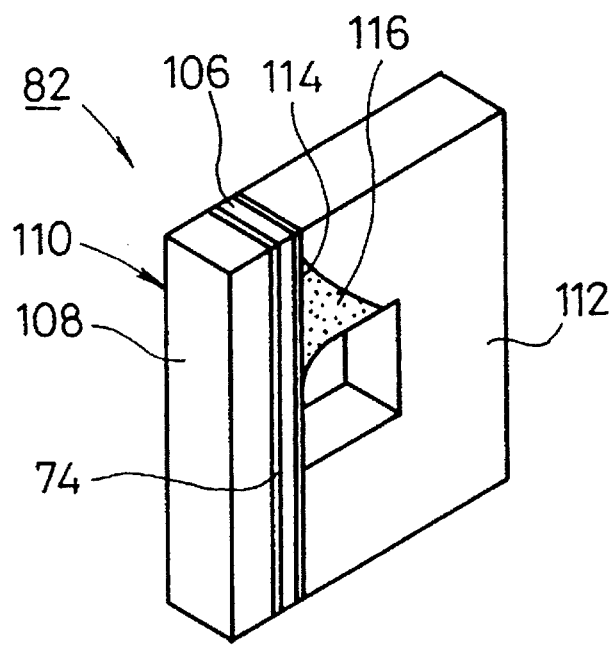
Figure 18:
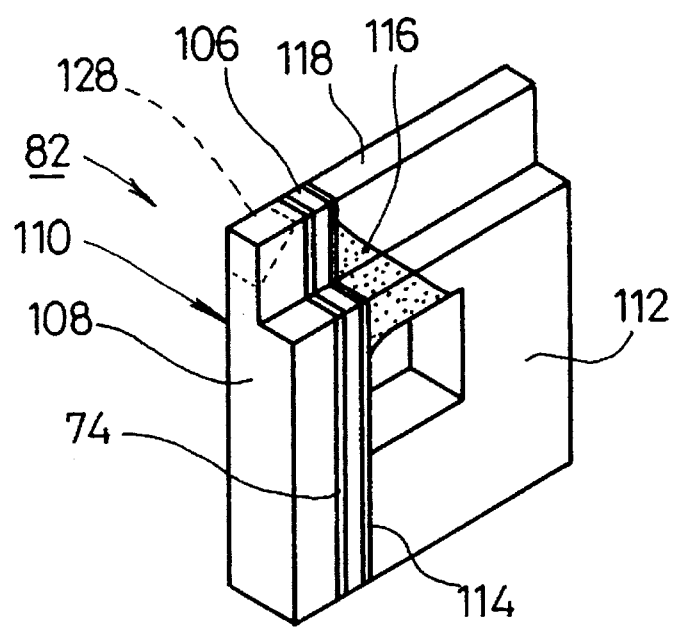

Then, as shown in FIG. 17, the ferrite plate 106 of the composite 110 is joined to a C-shaped body 112 of Mn—Zn ferrite by a glass layer 114 having a low melting point, thereby producing a core chip 82. The glass layer 114 may be made of any glass insofar as it has a softening temperature, preferably 450° C. or lower, which is lower than the softening temperature of the glass of the glass layer 74, so that the glass layer 114 can join the ferrite plate 106 and the body 112 to each other at the softening temperature thereof. The core chip 82 is of a rectangular annular structure including the Mn—Zn ferrite plate 106, the Mn—Zn ferrite body 112, and a magnetic gap 116. Subsequently, as shown in FIG. 18, an upper end of the core chip 82 is stepped to provide a track 118, and then chamfered to provide a trailing chamfer 128 as indicated by the broken line.

Because of the nonmagnetic ceramics plate 108, the portion of the core chip 82 which is made of Mn—Zn ferrite has a reduced cross-sectional area, resulting in a reduction in the inductance of the core chip 82. Consequently, the core chip 82 is capable of recording signals at a higher density, i.e., at higher frequencies, on a recording medium such as a magnetic disk. Even though the portion of the core chip 82 which is made of Mn—Zn ferrite has a reduced cross-sectional area, the core chip 82 maintains a required mechanical strength as it is reinforced by the nonmagnetic ceramics plate 108.

The high-melting-point glass layer 74 which joins the ferrite plate 106 and the nonmagnetic ceramics plate 108 to each other is prevented from being softened and hence from curving the composite 110 when the composite 110 is joined to the body 112 by the low-melting-point glass layer 114.

Figure 19:
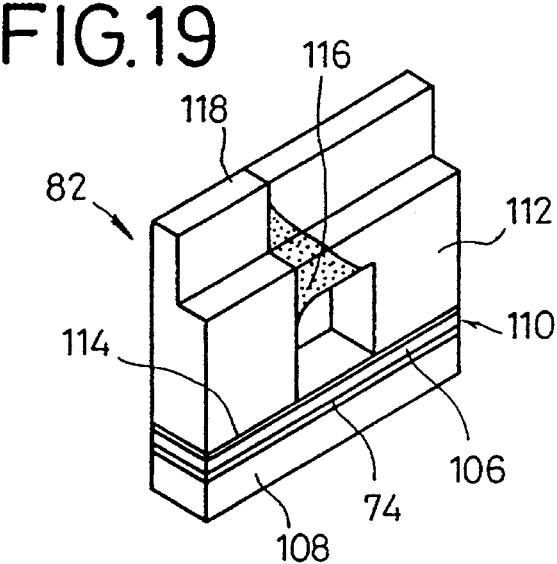
FIG. 19 is a fragmentary perspective view showing a modified method.

The composite 110 may be joined to a C-shaped core chip body 112 in a configuration shown in FIG. 19.

Figure 20:
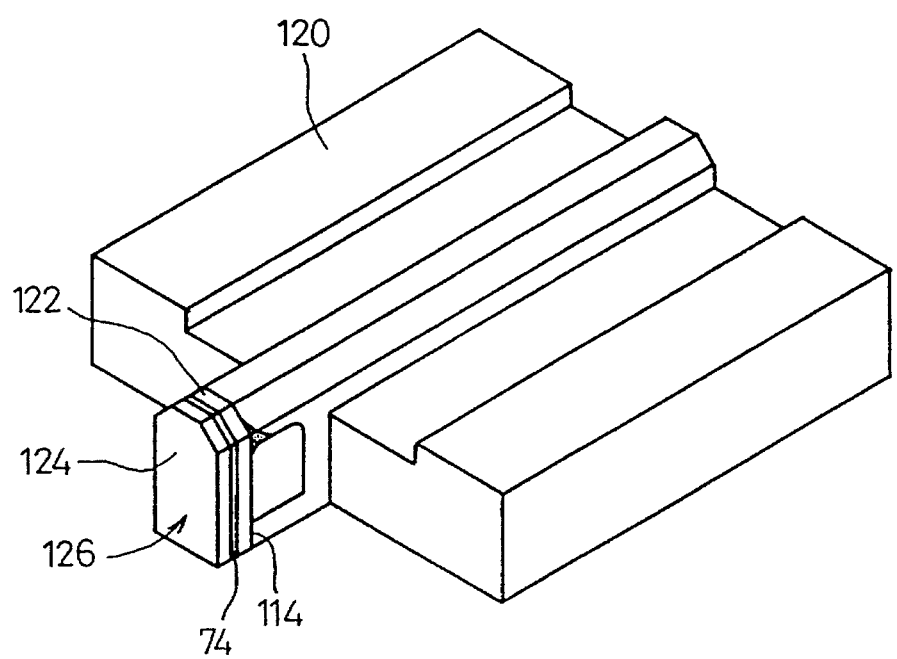
FIG. 20 is a fragmentary perspective view of a core slider for use in a monolithic magnetic head, combined with a composite manufactured according to the present invention.

FIG. 20 shows a core slider 120 for use in a monolithic magnetic head. A composite 126 is fabricated by joining a ferrite plate 122 and a nonmagnetic ceramics plate 124 with a glass layer 74 having a high melting point. The composite 126 thus fabricated is then joined to a chip end of the core slider 120 by a glass layer 114 having a low melting point. With this arrangement, the monolithic magnetic head has a reduced inductance for high-density recording.

Figure 21:
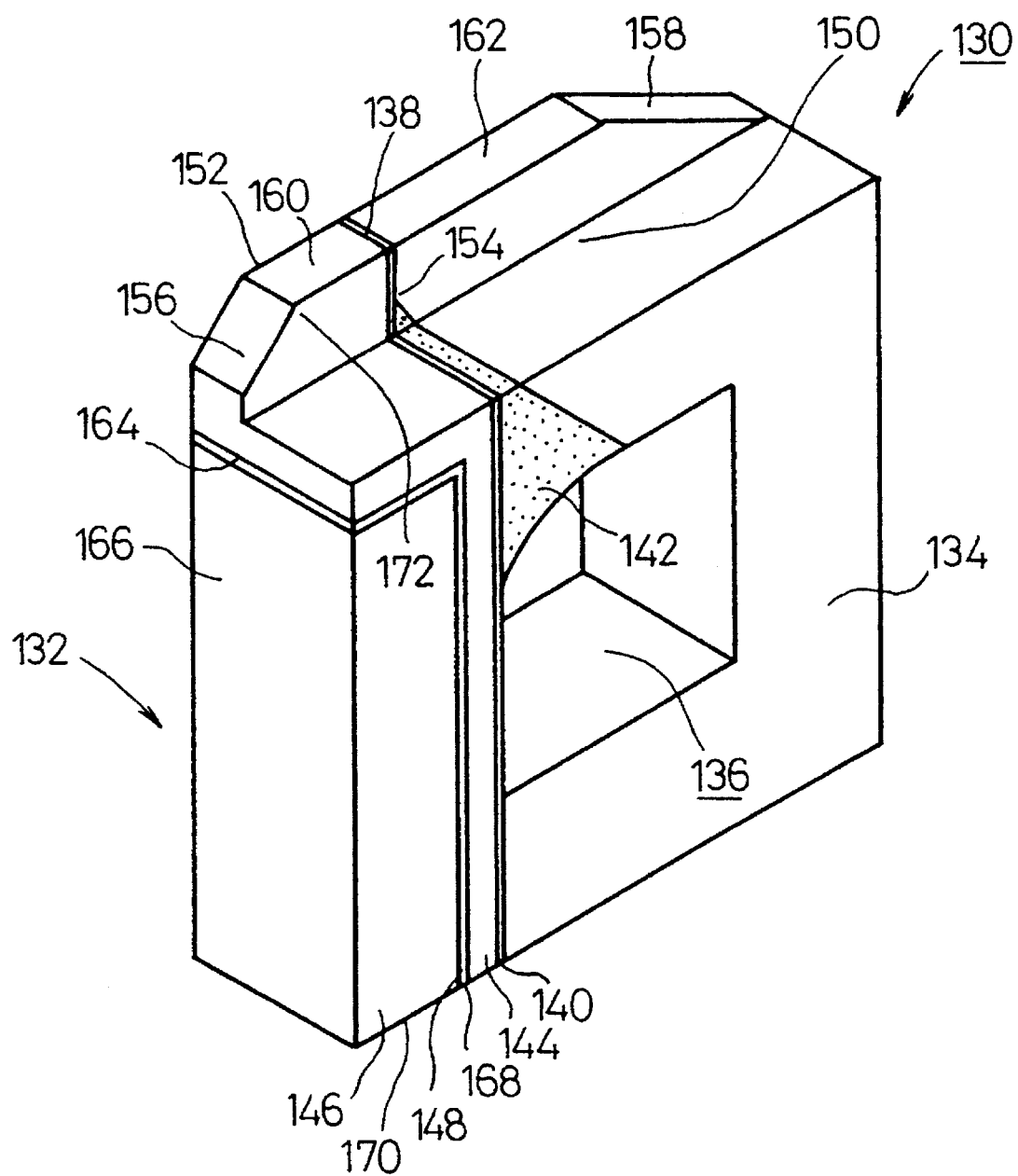
FIG. 21 is a perspective view of a core chip for use in a composite magnetic head.

FIG. 21 shows a core chip 130 for use in a composite magnetic head. The core chip 130 comprises a trailing core 132 and a leading core 134. The leading core 134 is of a C-shaped cross section and has a coil winding groove 136 defined therein. The trailing core 132 has an I-shaped cross section and has no coil winding groove. The C-shaped leading core 134 has upper and lower arms spaced from each other. The upper arm has a distal end cut off to define a magnetic gap 138 of a certain depth. The distal ends of the upper and lower arms of the leading core 134, and a side of the trailing core 132 are joined to each other through a gap glass layer 140, with the magnetic gap 138 being defined between the distal end of the upper arm of the leading core 134 and the side of the trailing core 132. A space defined below the magnetic gap 138 between the leading core 134 and the trailing core 132 is filled up with an apex glass 142. The leading core 134 is made of Mn—Zn ferrite.

The trailing core 132 is made of a composite including a segment 144 of Mn—Zn ferrite, a segment 146 of CaTiO$_3$, and a glass layer 148 which joins the segments 144, 146 to each other. Since the trailing core 132 is formed with the composite including the Mn—Zn ferrite segment 144 and the CaTiO$_3$ segment 146, the thickness of the Mn—Zn ferrite segment 144 may be reduced. Accordingly, the magnetic head core may be reduced in inductance for making the magnetic head suitable for recording and reproducing signals of higher frequencies. With the CaTiO$_3$ segment 146 being joined to the Mn—Zn ferrite segment 144, the overall thickness of the trailing core 132 may be kept relatively large for maintaining a mechanical strength required to support a coil winding even if the Mn—Zn ferrite segment 144 is thin.

The trailing and leading cores 132, 134 jointly have a track forming region 150 defined as a vertical step in upper ends thereof, providing a track 152 of a predetermined width on one side of the upper ends of the trailing and leading cores 132, 134. The track forming region 150 has its lower end positioned below an apex or upper end 154 of the apex glass 142. The track 152 has a trailing chamfer 156 on the upper surface of a front end thereof and a leading chamfer 158 on the upper surface of a rear end thereof. The track 152 has an upper surface 160 positioned on the trailing core 132, and an upper surface 162 positioned on the leading core 134, the upper surfaces 160, 162 being slidable against a magnetic disk.

According to the embodiment shown in FIG. 21, the Mn—Zn ferrite segment 144 and the CaTiO$_3$ segment 146 have respective joint surfaces joined to each other by the glass layer 148 and having opposite end faces. One of these end faces, 164, which is closer to the slidable surface 160, is positioned at a vertical side surface 166 of the trailing core 132 which lies perpendicularly to the slidable surface 160, and the other end face 168 remote from the slidable surface 160 is positioned at a bottom surface 170 of the trailing core 132.

Because the end face 164 of the joint surfaces of the Mn—Zn ferrite segment 144 and the CaTiO$_3$ segment 146 is positioned at the vertical side surface 166 of the trailing core 132 which lies perpendicularly to the slidable surface 160, the joint surfaces of the Mn—Zn ferrite segment 144 and the CaTiO$_3$ segment 146 are not exposed on the slidable surface 160. Therefore, any edges of the joint surfaces of the Mn—Zn ferrite segment 144 and the CaTiO$_3$ segment 146 do not read signals recorded on a recording medium, and no readout errors are caused.

Since a region in the vicinity of the slidable surface 160 of the trailing core 132 is composed of only the Mn—Zn ferrite segment 144, the trailing chamfer 156 is positioned on the Mn—Zn ferrite segment 144 remotely from the magnetic gap 138. Consequently, it is highly unlikely for the magnetic gap 138 to be damaged when the trailing core 132 is machined to produce the trailing chamfer 156. With the trailing chamfer 156 on the Mn—Zn ferrite segment 144, an edge 172 formed on the Mn—Zn ferrite segment 144 at the slidable surface 160 by the trailing chamfer 156 is made blunt. Therefore, the edge 172 does not read signals recorded on a recording medium, causing no readout errors.

Furthermore, as the end face 164 of the joint surfaces of the Mn—Zn ferrite segment 144 and the CaTiO$_3$ segment 146 is positioned more remotely from the sliding surface 160 than the track forming region 150, only the Mn—Zn ferrite segment 144 may be machined to produce the track 152, and hence the joint surfaces of the Mn—Zn ferrite segment 144 and the CaTiO$_3$ segment 146 are not machined when the track 152 is produced. Consequently, when the track 152 is produced, the track 152 is prevented from being cracked or chipped. In addition, the track 152 can be machined easily with high accuracy.

A method of manufacturing the core chip 130 shown in FIG. 21 will be described below with reference to FIGS. 22 through 28.

Figure 22:
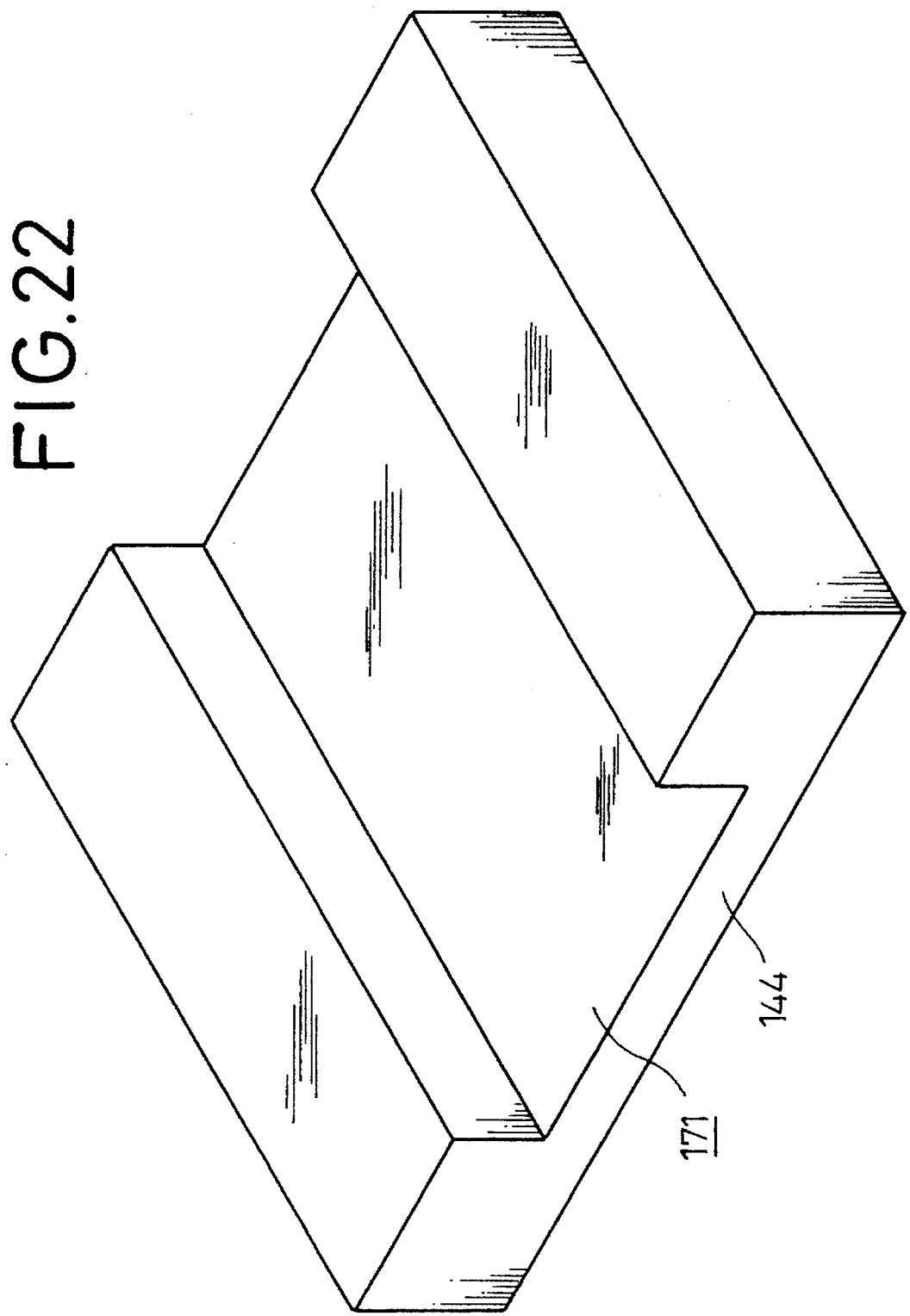
FIGS. 22 through 28 are fragmentary perspective views illustrative of a method of manufacturing the core chip shown in FIG. 21.

First, as shown in FIG. 22, a groove 171 with open opposite ends is defined in a surface of an Mn—Zn ferrite segment 144 in the form of a rectangular parallelepiped.

Figure 23:
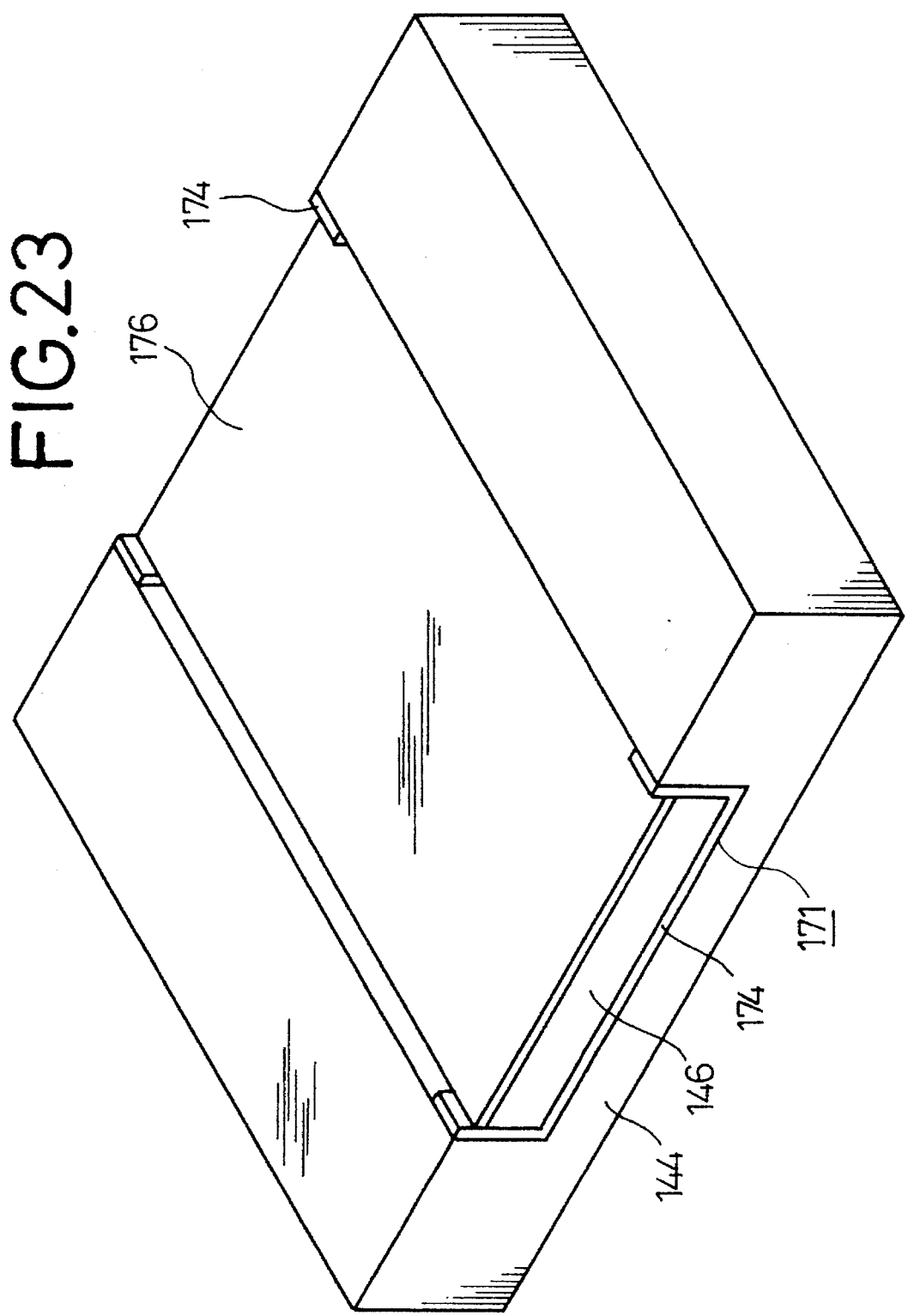
Figure 24:
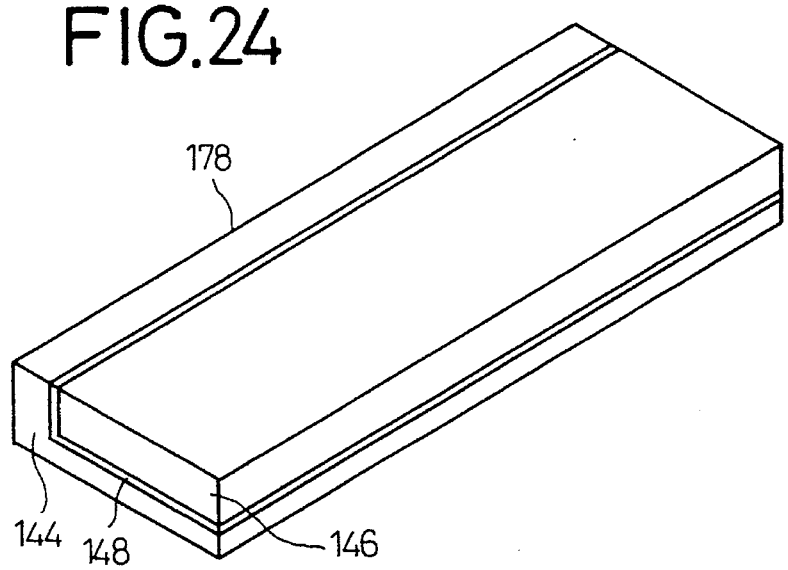

Then, as shown in FIG. 23, a CaTiO$_3$ segment 146 is disposed in the groove 171 with a pair of spacers 174 of ceramics being positioned at the respective opposite ends of the groove 171 beneath the CaTiO$_3$ segment 146.

A glass plate 176 having a high melting point whose softening temperature ranging from 600° C. to 700° C. is placed on the CaTiO$_3$ segment 146.

Thereafter, the high-melting-point glass plate 176 is heated to 900° C., and the melted glass flows into a space defined between the CaTiO$_3$ segment 146 and the surfaces of the groove 171. The assembly is then cooled to solidify the melted glass into a glass layer 148 which joins the CaTiO$_3$ segment 146 and the Mn—Zn ferrite segment 144 to each other.

The side surfaces of the CaTiO$_3$ segment 146 are spaced from the corresponding side surfaces of the groove 171 by a distance ranging from 10 µm to 50 µm. The bottom surface of the CaTiO$_3$ segment 146 is also spaced from the bottom surface of the groove 171 by a distance ranging from 10 µm to 50 µm. If these distances were smaller than 10 µm, then the glass of the glass layer 176 would not easily flow into the space between the CaTiO₃ segment 146 and the surfaces of the groove 171. If the distances were larger than 50 μm, then when the joined composite is cut off, it would exert too a large cutting resistance.

Then, extra glass is removed from the assembly, and the opposite ends thereof where the spacers 174 are present are cut off. The assembly is then cut off at its center and its surfaces are ground to given dimensions, thus producing a trailing core segment 178 (see FIG. 24) that is composed of the CaTiO₃ segment 146 and the Mn—Zn ferrite segment 144 which are joined to each other by the glass layer 148.

Figure 25:
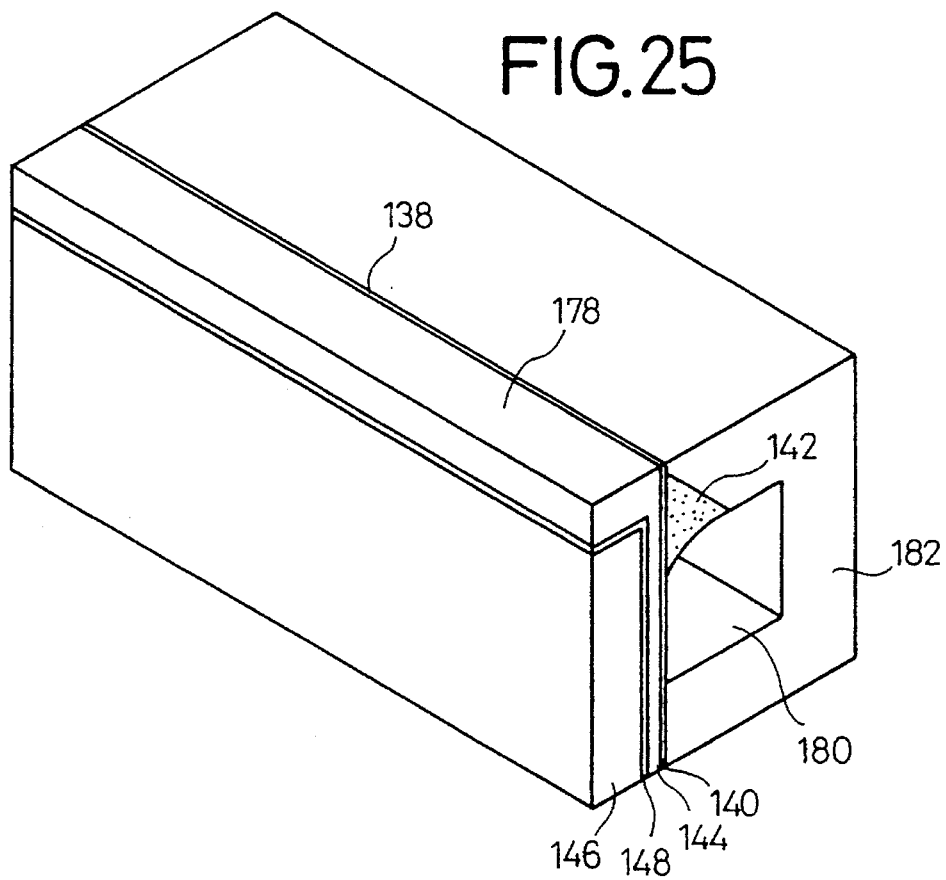

Then, as shown in FIG. 25, the trailing core segment 178 and a leading core segment 182 with a coil winding groove 180 defined therein are joined to each other by a gap glass layer 140 which provides a magnetic gap 138. The gap glass layer 140 has been deposited in advance by sputtering on either the leading core segment 182 or the trailing core segment 178 or both the leading core segment 182 and the trailing core segment 178. An apex glass 142 is disposed below the magnetic gap 138. The apex glass 142 can be formed by placing fiberglass below the magnetic gap 138 and then heating the fiberglass until it is softened. The gap glass layer 140 and the apex glass 142 are simultaneously softened at about 600° C. The CaTiO₃ segment 146 and the Mn—Zn ferrite segment 144 are joined to each other by the glass layer 148 whose softening temperature ranges from 600° C. to 700° C. Consequently, when the leading core segment 182 and the trailing core segment 178 are joined to each other, the glass layer 148 is not softened, and the CaTiO₃ segment 146 and the Mn—Zn ferrite segment 144 which have been joined thereby are not dislocated. The gap glass layer 140 is made of glass having a softening temperature of 550° C., and the apex glass 142 is made of glass having a softening temperature of 450° C.

Figure 26:
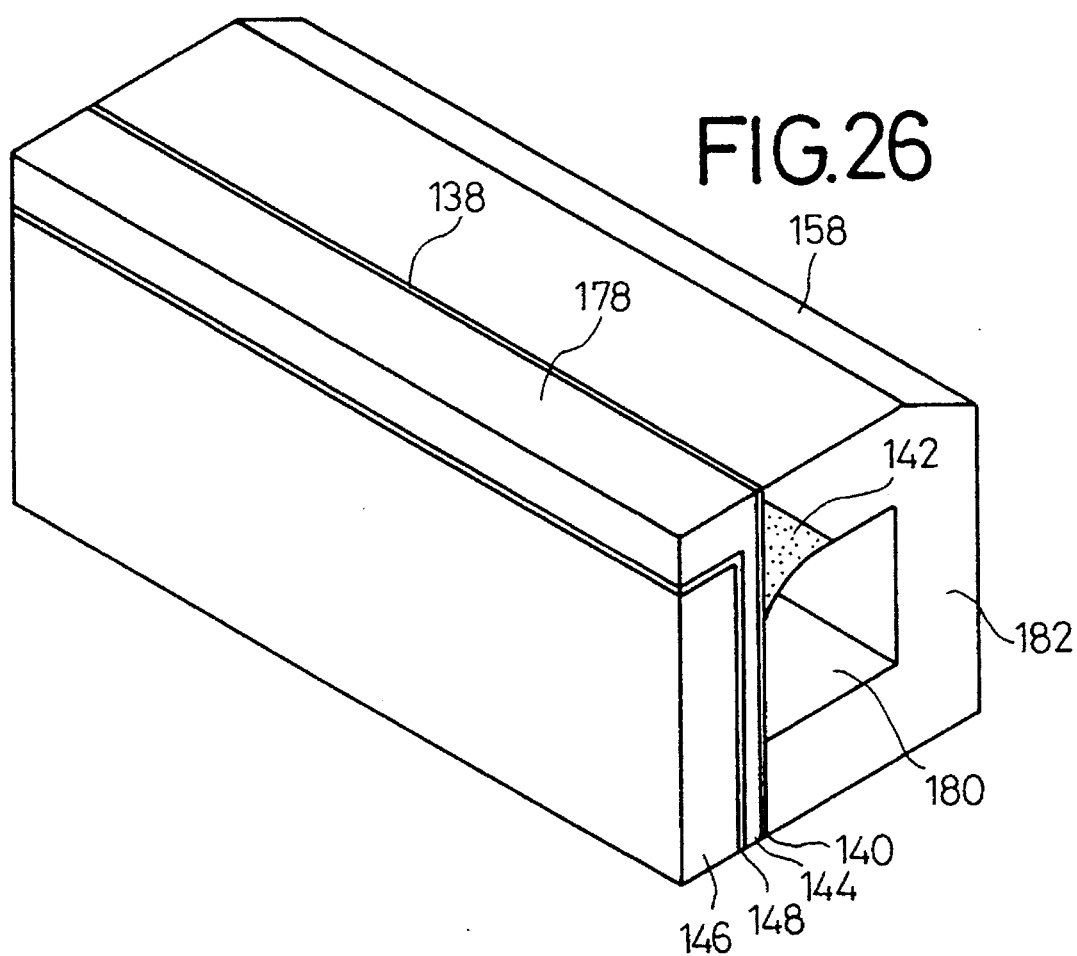

Then, as shown in FIG. 26, the assembly is chamfered to produce a leading chamfer 158.

Figure 27:
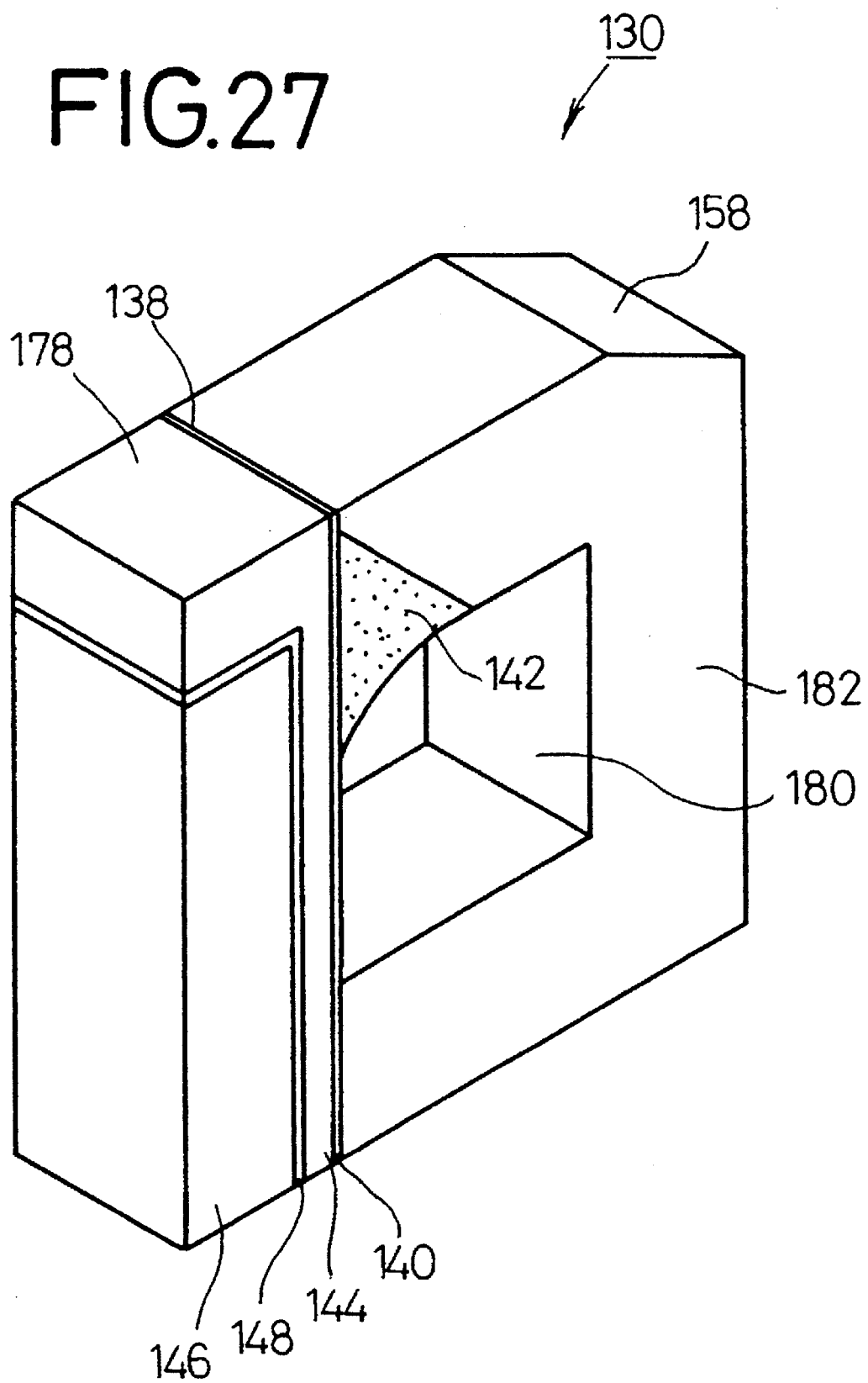

Then, as shown in FIG. 27, the assembled is sliced into a plurality of core chips 130.

Figure 28:
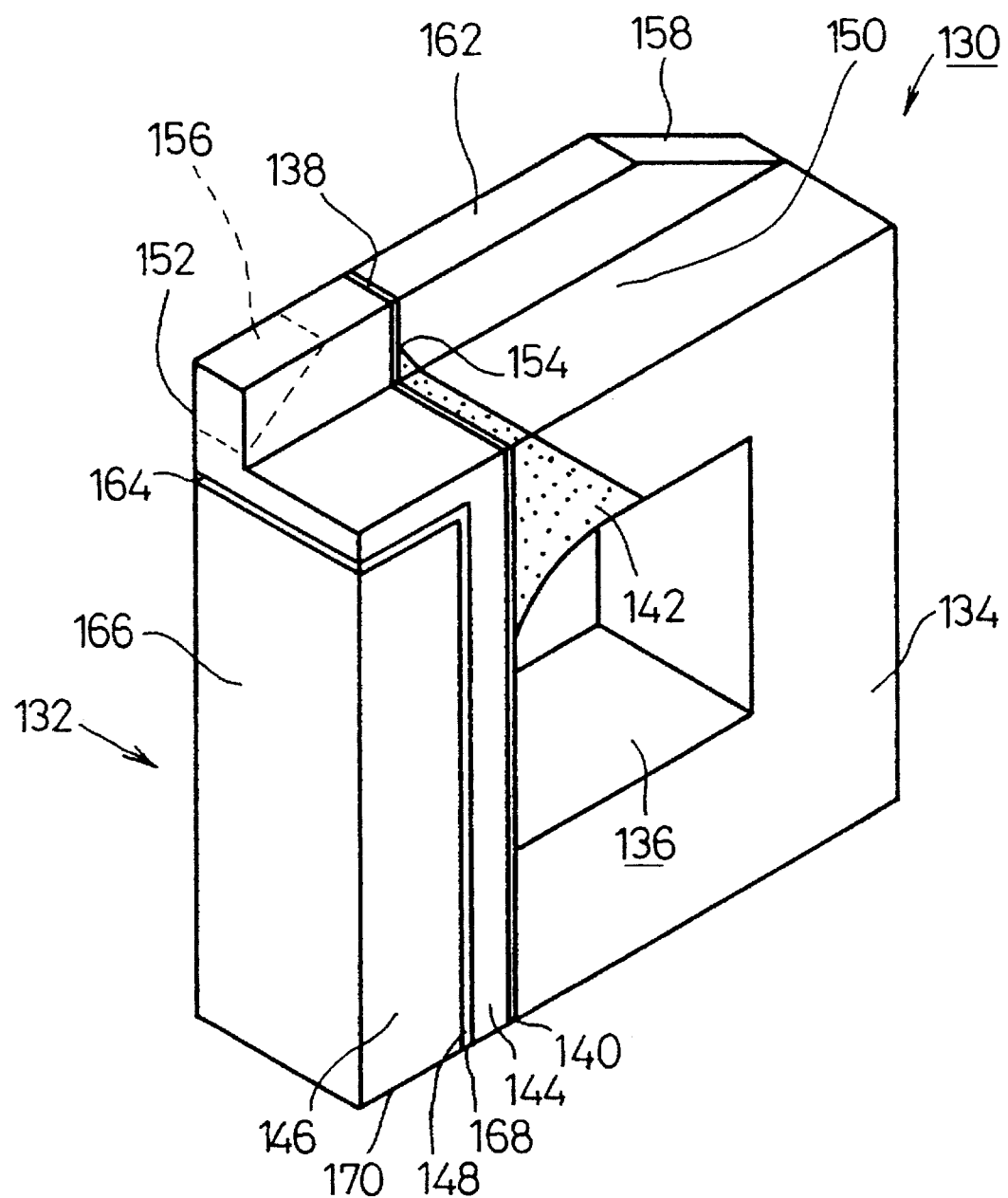

Then, as shown in FIG. 28, each of the core chips 130 is machined to form a track forming region 150 as a vertical step, thus providing a track 152.

Figure 1:
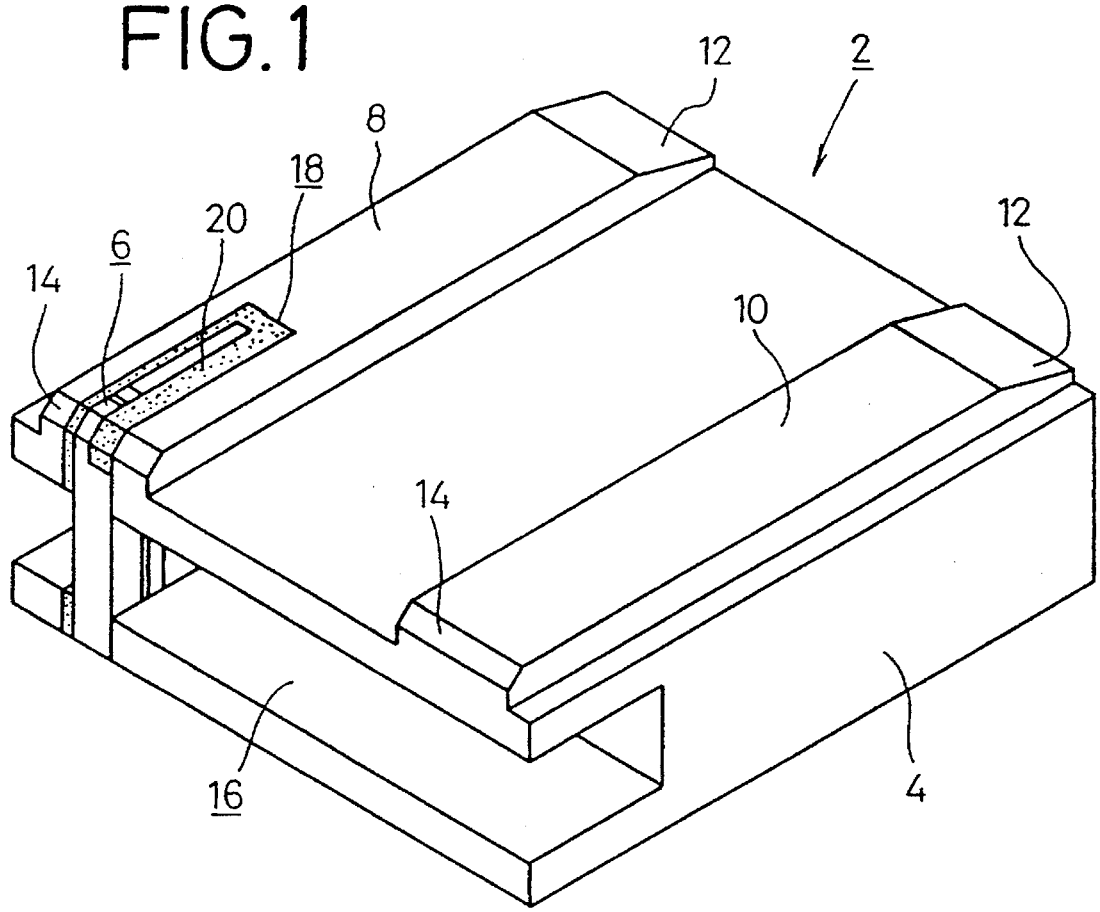
FIG. 1 is a perspective view of a conventional composite magnetic head.
Figure 2:
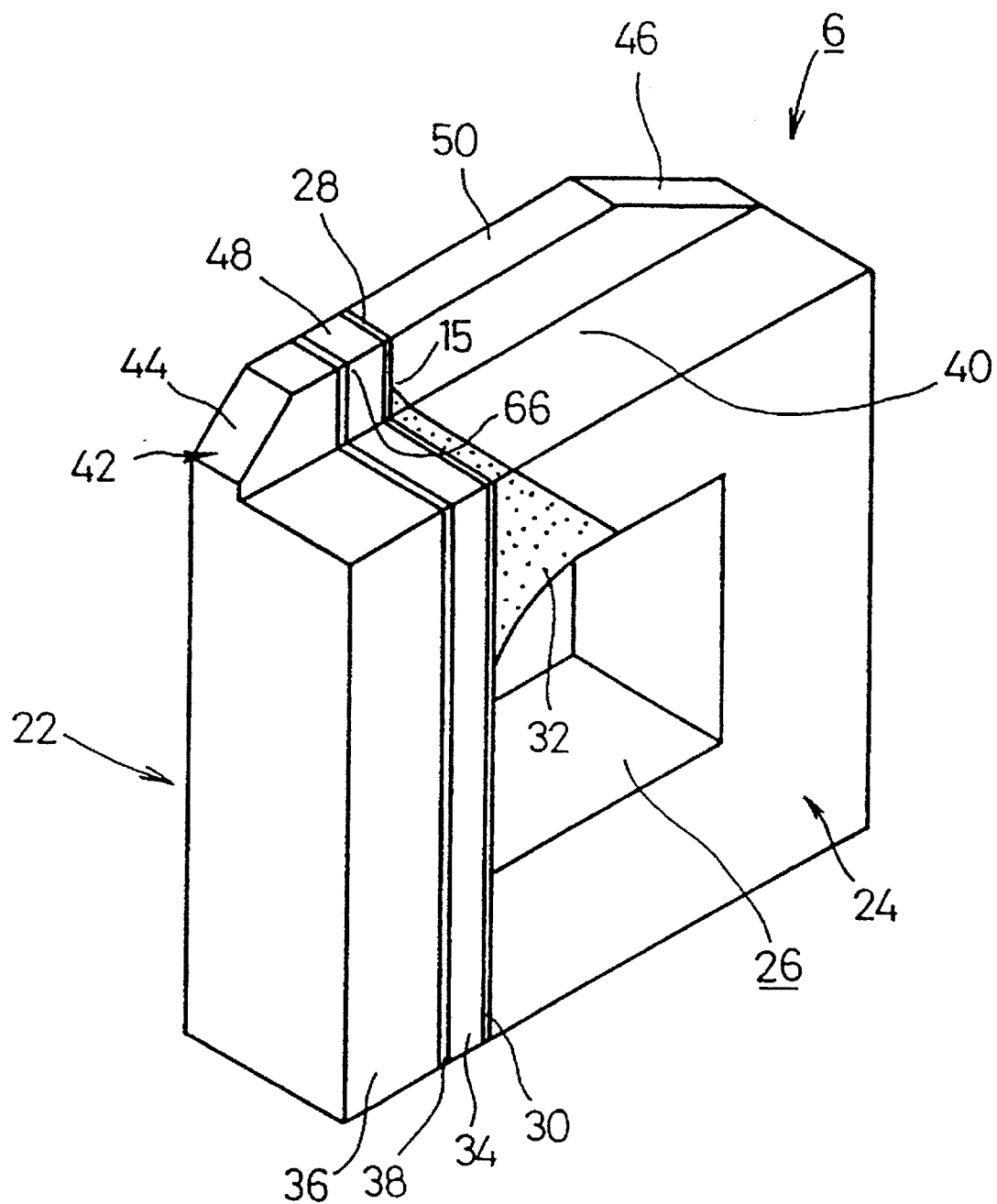
FIG. 2 is a core chip including a composite used for the conventional composite magnetic head shown in FIG. 1
Figure 3:
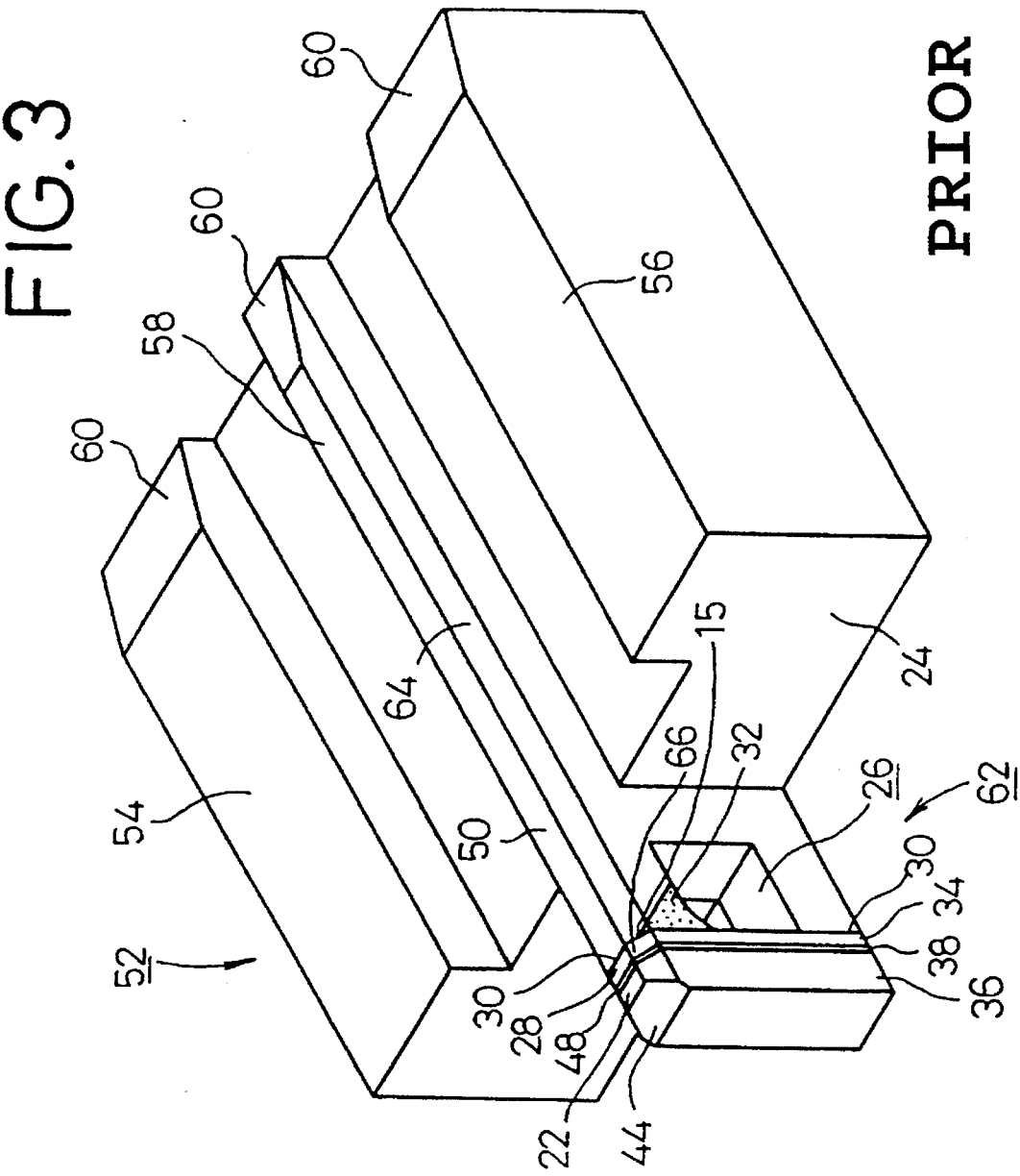
FIG. 3 is a perspective view of a conventional monolithic magnetic head including a composite.

Then, the core chip 130 shown in FIG. 28 is inserted into the core chip insertion groove 18 defined in the slider body 4 shown in FIG. 1 and fixed in place by the glass body 20.

Thereafter, the assembly is chamfered to produce a trailing chamfer 156 on the core chip 130 and the trailing chamfer 14 on the slider body 4 simultaneously. FIG. 21 shows the core chip 130 after it has been fixed to the slider body 4 and the trailing chamfer 156 has been formed.

Figure 29:
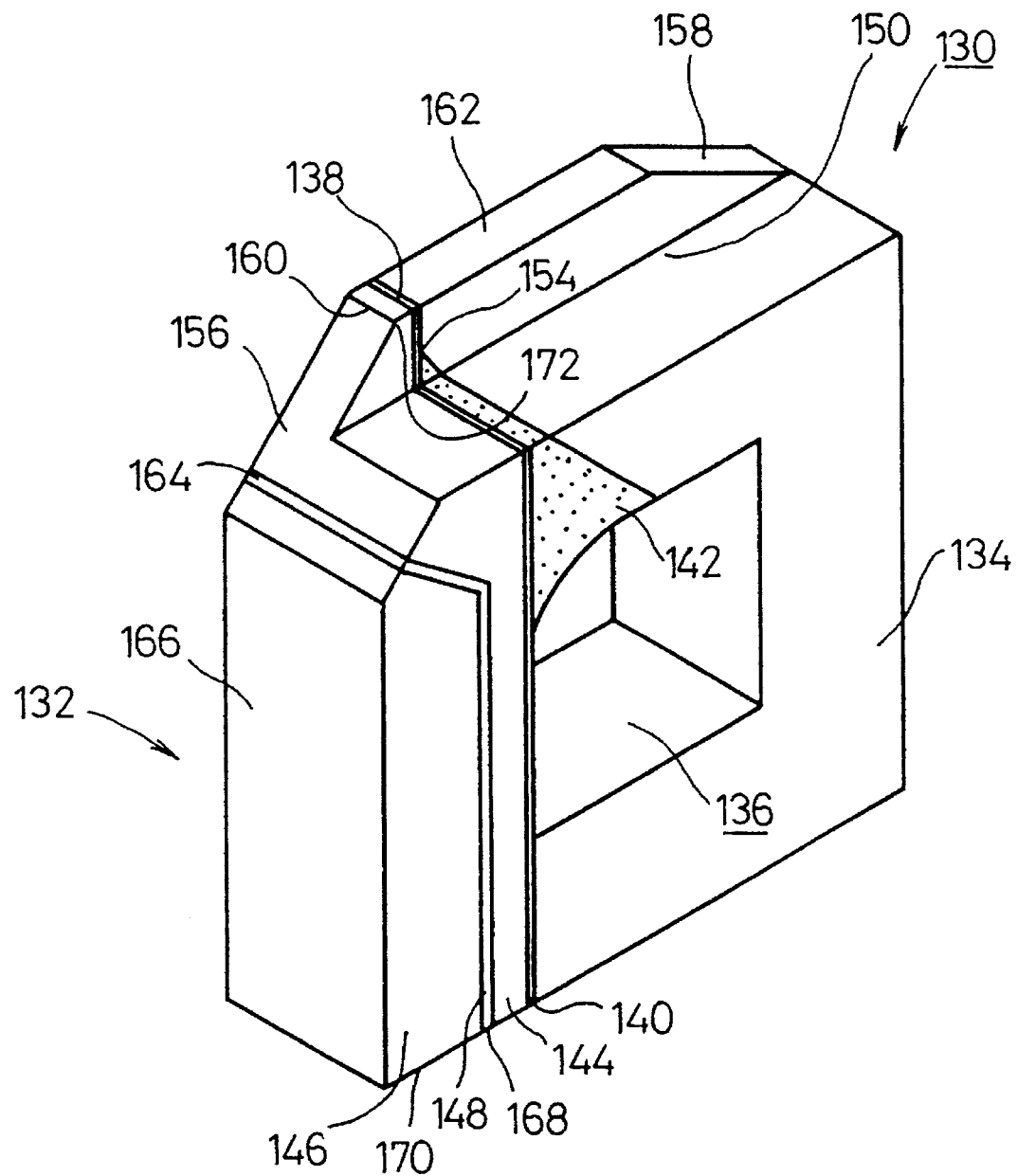
FIGS. 29 and 30 are fragmentary perspective views of a core chip for use in a composite magnetic head according to still according to another embodiment of the present invention.
Figure 30:
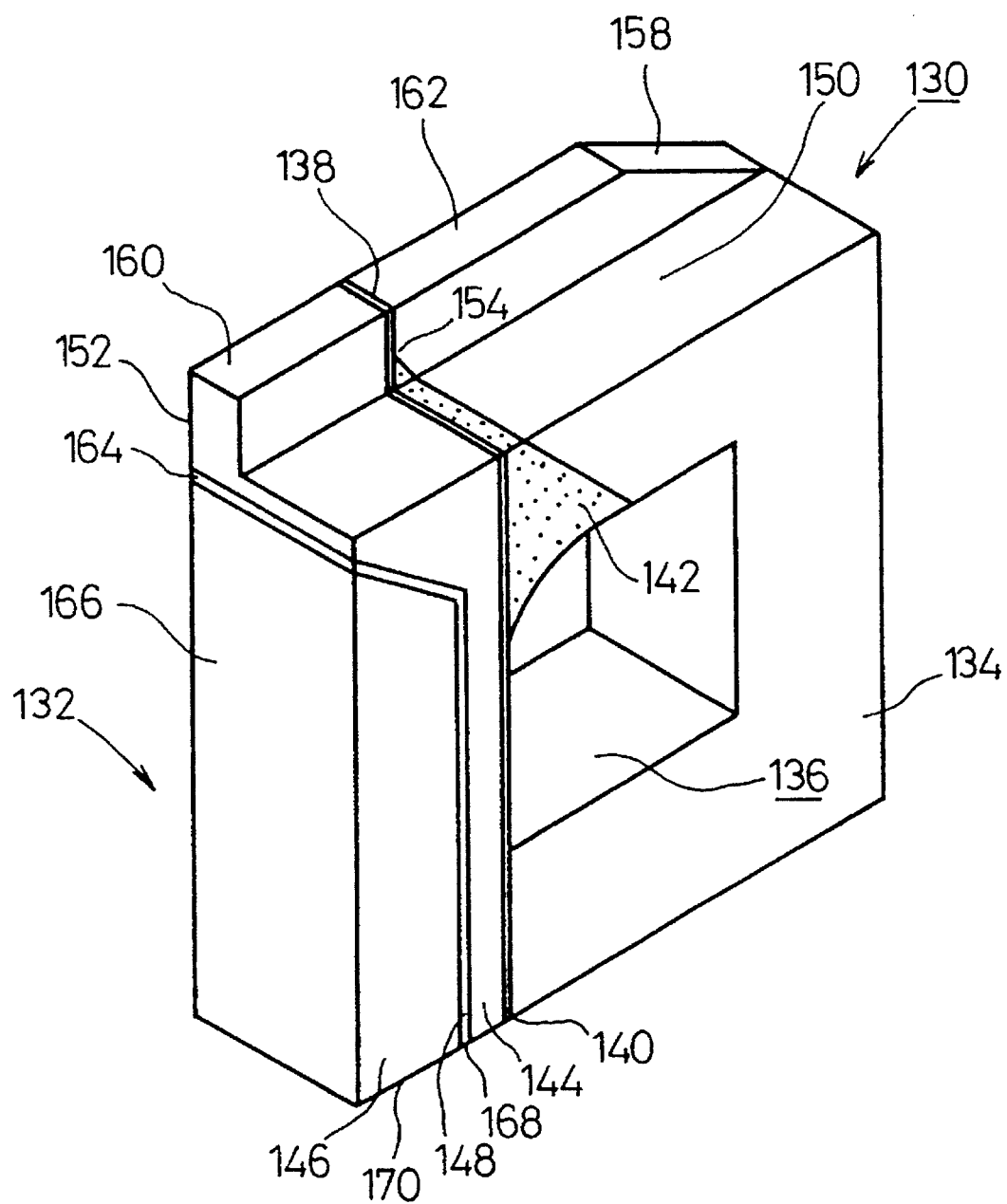

FIGS. 29 and 30 show a core chip 130 for use in a composite magnetic head according to still another embodiment of the present invention.

FIG. 29 illustrates, in perspective, the core chip 130 after it has been inserted and secured in the core chip insertion groove 18 defined in the slider body 4 shown in FIG. 1 and subsequently chamfered to provide a trailing chamfer 156. FIG. 30 illustrates, in perspective, the core chip 130 before it is inserted in the core chip insertion groove 18 defined in the slider body 4 shown in FIG. 1 and chamfered.

In the embodiment shown in FIGS. 21 through 28, the joined joint surfaces or boundary layer of the Mn—Zn ferrite segment 144 and the CaTiO₃ segment 146 extend substantially perpendicularly to the vertical side surface 166 of the trailing core 132 which lies perpendicularly to the sliding surface 160, and the end face 164 of the joint surfaces, which is closer to the slidable surface 160, is positioned at the vertical side surface 166 of the trailing core 132. In the embodiment shown in FIGS. 29 and 30, however, the joined joint surfaces or boundary layer of the Mn—Zn ferrite segment 144 and the CaTiO₃ segment 146 extend obliquely upwardly with respect to the vertical side surface 166 of the trailing core 132 which lies perpendicularly to the slidable surface 160, and the end face 164 of the joint surfaces, which is closer to the slidable surface 160, is positioned at the trailing chamfer 156. The other details of the composite magnetic head shown in FIGS. 29 and 30 are the same as those of the composite magnetic head shown in FIG. 21.

Since the end face 164 of the joint surfaces of the Mn—Zn ferrite segment 144 and the CaTiO₃ segment 146, which is closer to the slidable surface 160, is positioned at the trailing chamfer 156, the joint surfaces of the Mn— Zn ferrite segment 144 and the CaTiO₃ segment 146 are not exposed on the slidable surface 160. Therefore, any edges of the joint surfaces of the Mn—Zn ferrite segment 144 and the CaTiO₃ segment 146 do not read signals recorded on a recording medium, and no readout errors are caused.

In the embodiment shown in FIGS. 29 and 30, since a region in the vicinity of the slidable surface 160 of the trailing core 132 is composed of only the Mn—Zn ferrite segment 144, the trailing chamfer 156 is positioned on the Mn—Zn ferrite segment 144 remotely from the magnetic gap 138. Consequently, it is highly unlikely for the magnetic gap 138 to be damaged when the trailing core 132 is machined to produce the trailing chamfer 156. With the trailing chamfer 156 on the Mn—Zn ferrite segment 144, an edge 172 formed on the Mn—Zn ferrite segment 144 at the sliding surface 160 by the trailing chamfer 156 is made blunt. Therefore, the edge 172 does not read signals recorded on a recording medium, causing no readout errors.

It is preferable to position the end face 164 of the joint surfaces or boundary layer of the Mn—Zn ferrite segment 144 and the CaTiO₃ segment 146, which is closer to the slidable surface 160, more remotely from the slidable surface 160 than the track forming region 150. In this manner, when the track 152 is formed, only the Mn—Zn ferrite segment 144 may be machined. The track 152 can easily be machined with high accuracy.

Figure 31:
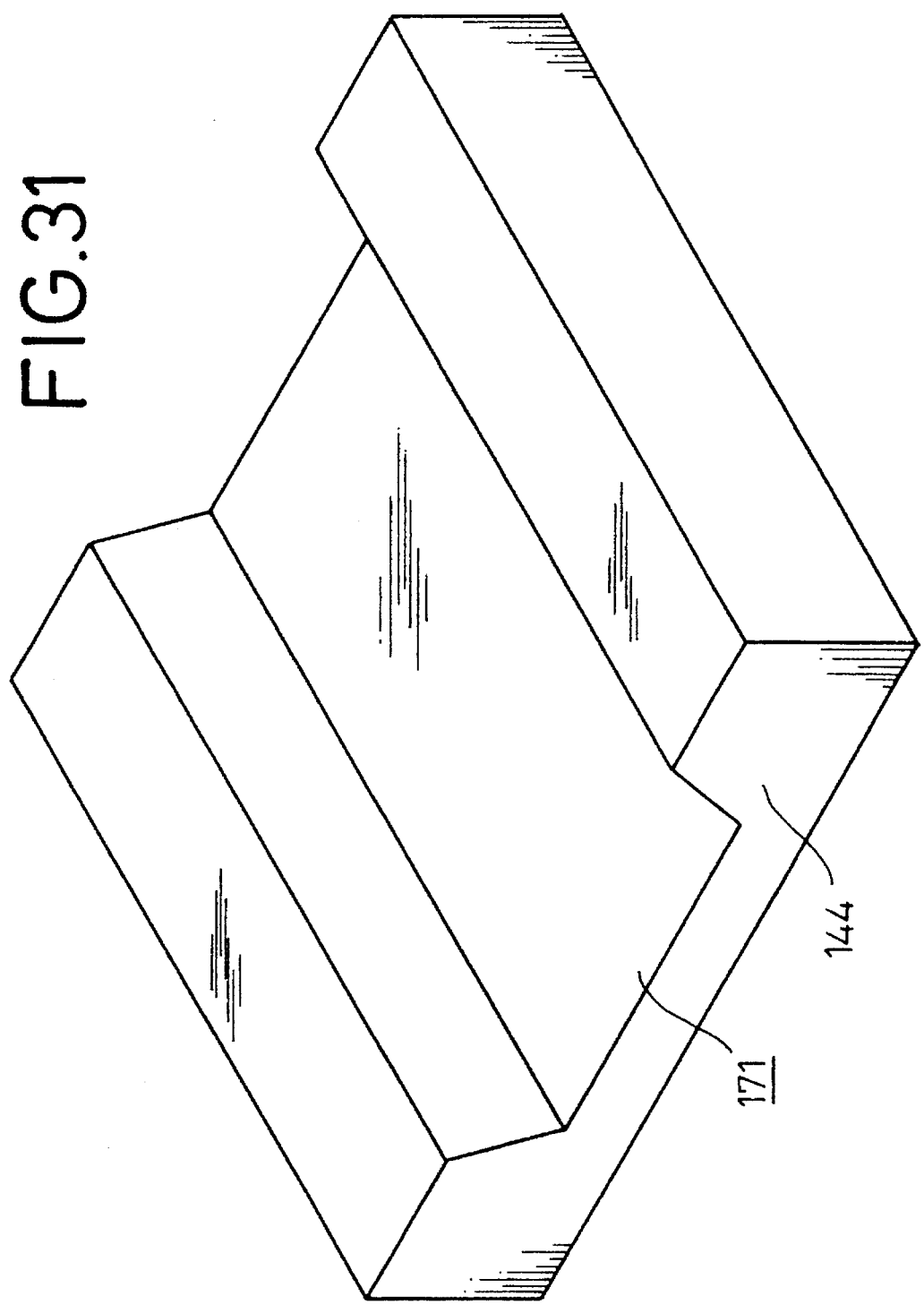
FIGS. 31 through 33 are fragmentary perspective views illustrative of a method of manufacturing a core chip for use in a composite magnetic head according to yet still another embodiment of the present invention.
Figure 32:
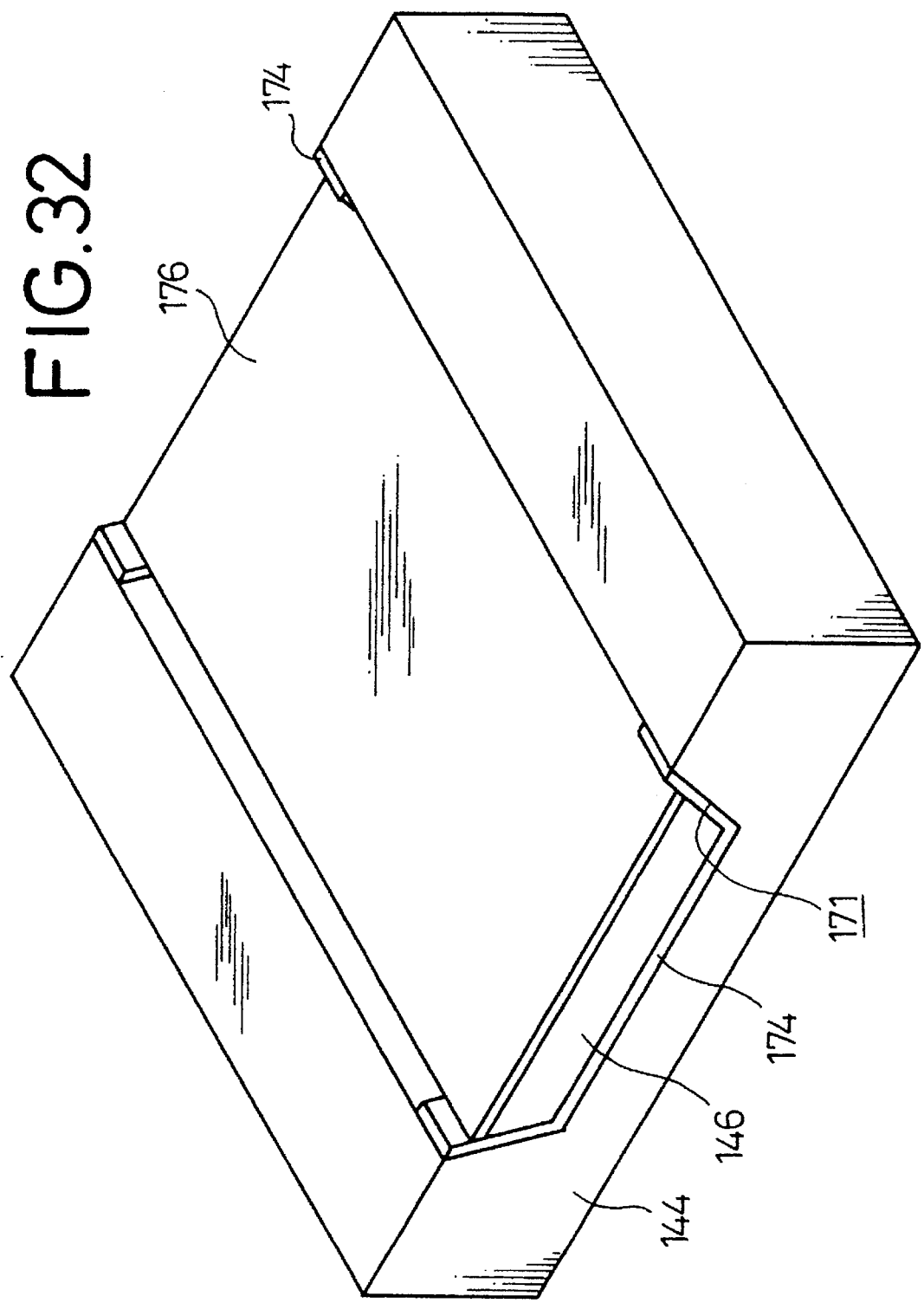
Figure 33:
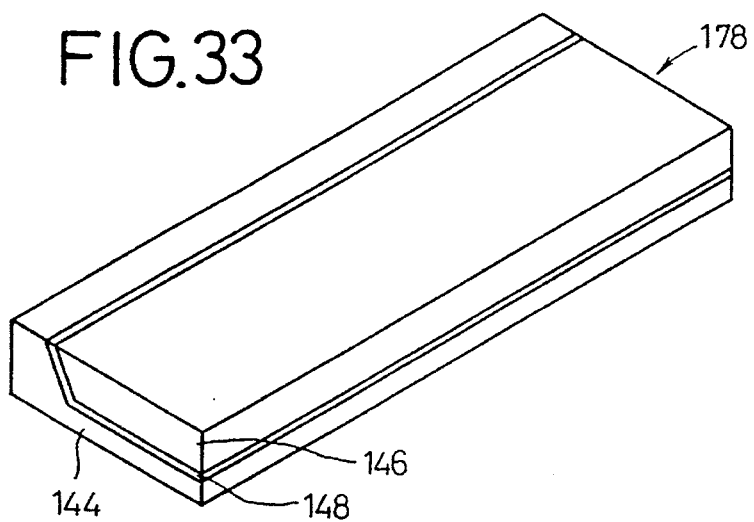

FIGS. 31 through 33 are illustrative of a method of manufacturing a core chip 130 for use in a composite magnetic head according to yet still another embodiment of the present invention.

In the embodiment shown in FIGS. 22 through 28, the side surfaces of the groove 171 lie substantially perpendicularly to the surface of the Mn—Zn ferrite segment 144 in the form of a rectangular parallelepiped, and the opposite side surface of the CaTiO₃ segment 146 also lie perpendicularly to the surface of the Mn—Zn ferrite segment 144. According to the embodiment shown in FIGS. 31 through 33, however, the sides of a groove 171 lie obliquely to the surface of an Mn—Zn ferrite segment 144 in the form of a rectangular parallelepiped, and the opposite side surface of a CaTiO₃ segment 146 also lie obliquely to the surface of the Mn—Zn ferrite segment 144. The other details of the method shown in FIGS. 31 through 33 are the same as those of the method shown in FIGS. 22 through 28.

In the embodiment shown in FIGS. 31 through 33, the side surfaces of the groove 171 and the CaTiO₃ segment 146 are formed obliquely, and the CaTiO₃ segment 146 is supported on spacers 174. Therefore, the melted glass of a high-melting-point glass plate 174 easily flows into a space between the CaTiO$_3$ segment 146 and the surfaces of the groove 171. Thereafter, extra glass is removed from the assembly, and the opposite ends thereof where the spacers 174 are present are cut off. The assembly is then cut off at its center and its surfaces are ground to given dimensions, thus producing a trailing core segment 178 (see FIG. 33) that is composed of the CaTiO$_3$ segment 146 and the Mn—Zn ferrite segment 144 which are joined to each other by a glass layer 148.

Figure 34:
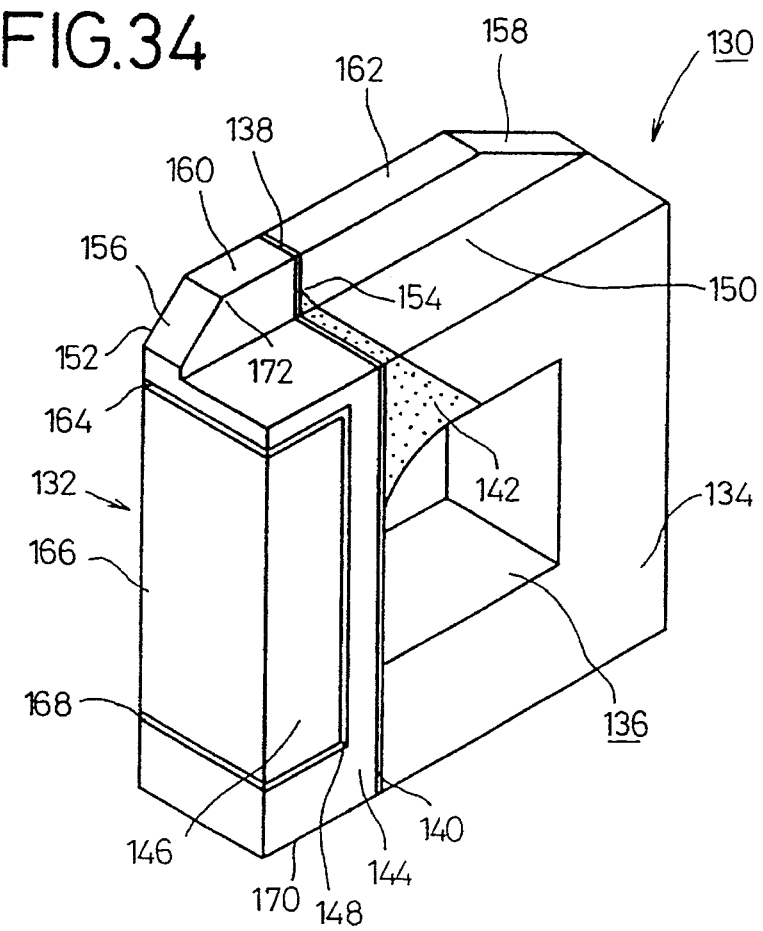
FIGS. 34 and 35 are fragmentary perspective views of a core chip for use in a composite magnetic head according to a further embodiment of the present invention.
Figure 35:
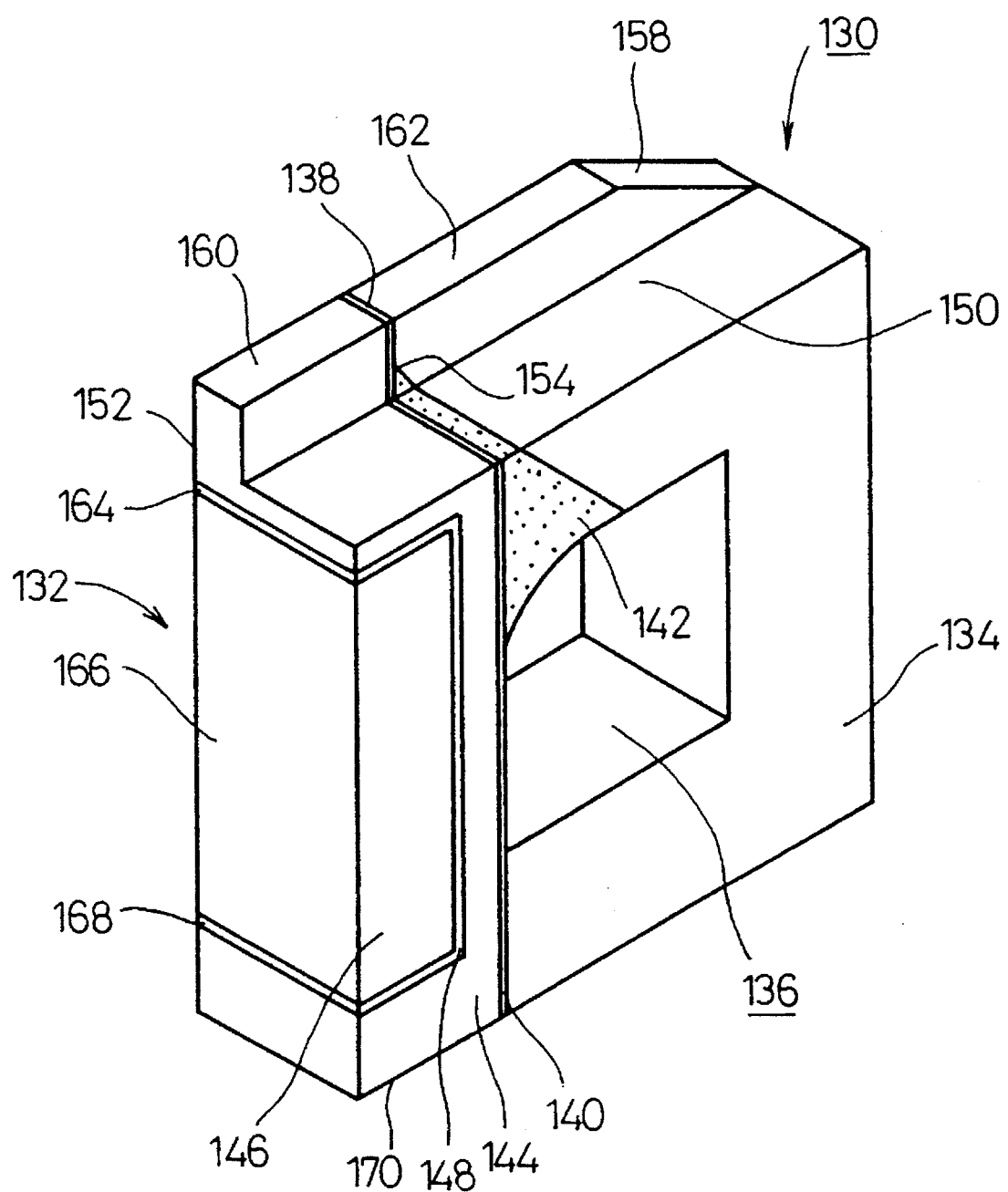

FIGS. 34 and 35 show a core chip 130 for use in a composite magnetic head according to a further embodiment of the present invention.

FIG. 34 illustrates, in perspective, the core chip 130 after it has been inserted and secured in the core chip insertion groove 18 defined in the slider body 4 shown in FIG. 1 and subsequently chamfered to provide a trailing chamfer 156. FIG. 35 illustrates, in perspective, the core chip 130 before it is inserted in the core chip insertion groove 18 defined in the slider body 4 shown in FIG. 1 and chamfered.

In the previous embodiments, an end face 168 of the joint surfaces or boundary layer of the Mn—Zn ferrite segment 144 and the CaTiO$_3$ segment 146, which is remote from the slidable surface 160, is positioned at the bottom surface 170 of the trailing core 132. In the embodiment shown in FIGS. 34 and 35, however, the end face 168 is positioned at the side surface 166 perpendicular to the slidable surface 160. The other details of the core chip 130 shown in FIGS. 34 and 35 are the same as those of the core chips according to the previous embodiments, and the core chip 130 shown in FIGS. 34 and 35 can be manufactured in the same manner as described above.

Figure 36:
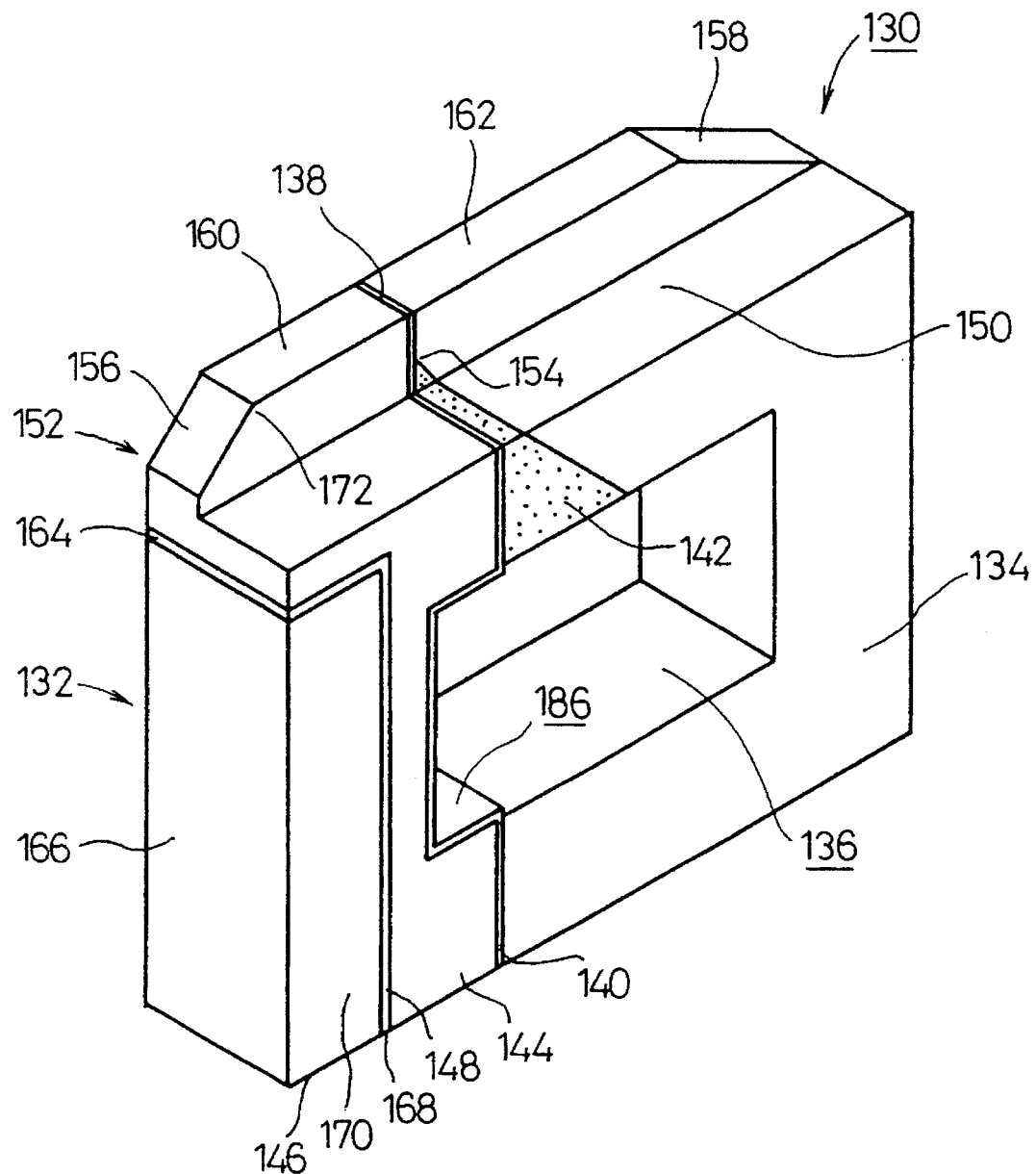
FIGS. 36 and 37 are fragmentary perspective views of a core chip for use in a composite magnetic head according to a still further embodiment of the present invention.
Figure 37:
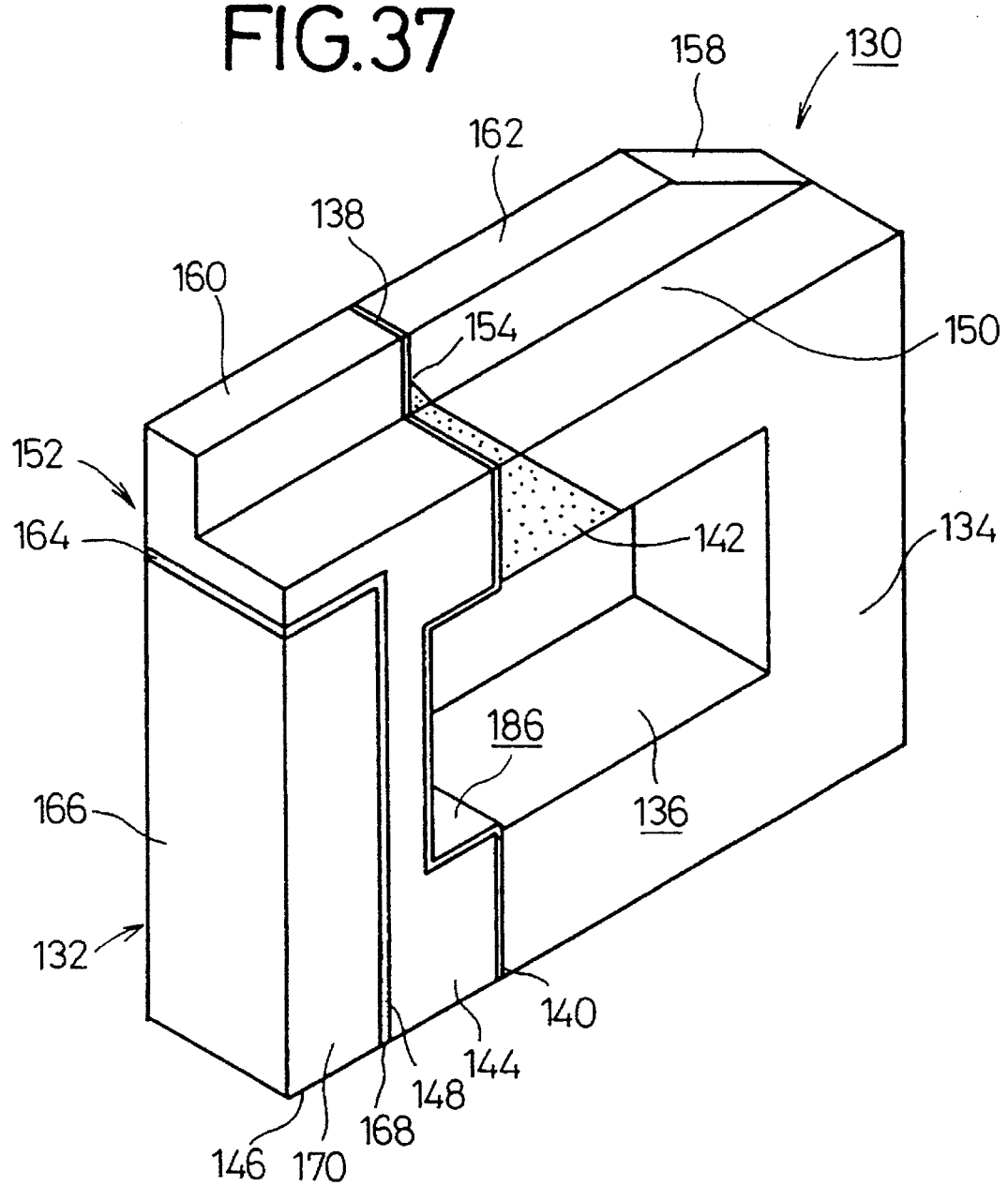

FIGS. 36 and 37 show a core chip 130 for use in a composite magnetic head according to a still further embodiment of the present invention.

FIG. 36 illustrates, in perspective, the core chip 130 after it has been inserted and secured in the core chip insertion groove 18 defined in the slider body 4 shown in FIG. 1 and subsequently chamfered to provide a trailing chamfer 156. FIG. 37 illustrates, in perspective, the core chip 130 before it is inserted in the core chip insertion groove 18 defined in the slider body 4 shown in FIG. 1 and chamfered.

In the previous embodiments, no coil winding groove is defined in the trailing core 132, and hence the trailing core 132 is of an I-shaped cross section. In the embodiment shown in FIGS. 36 and 37, however, a coil winding groove 186 is defined in an Mn—Zn ferrite segment 144 of a trailing core 132. The other details of the core chip 130 shown in FIGS. 36 and 37 are the same as those of the core chips according to the previous embodiments, and the core chip 130 shown in FIGS. 36 and 37 can be manufactured in the same manner as described above.

FIG. 38 shows a monolithic magnetic head according to a yet still further embodiment of the present invention.

The monolithic magnetic head shown in FIG. 38 has a trailing core 132 similar to the trailing cores 132 according to the previous embodiments. In FIG. 38, an end face 164 of the joint surfaces or boundary layer of an Mn— Zn ferrite segment 144 and a CaTiO$_3$ segment 146, which is closer to a sliding surface 160, is positioned at a side surface 166 of the trailing core 132 which lies perpendicularly to the slidable surface 160. The trailing core 132 shown in FIG. 38 can be manufactured in the same manner as the trailing cores 132 according to the previous embodiments.

The methods according to the present invention offer the following advantages:

When a first segment of Mn—Zn ferrite and a second segment of nonmagnetic ceramics are to be joined to each other, a groove is defined in the joint surface of at least one of the first and second segments, and the joint surfaces or boundary layer of the first and second segments are held against each other, or a spacer is put between the first and second segments to define a space therebetween, and melted glass is caused to flow into the groove or the space, thus joining the first and second segments. Since a glass layer of sufficient thickness is provided in the groove or the space between the joint surfaces or boundary layer of the first and second segments, it lessens thermal stresses that are developed due to the difference between coefficients of thermal expansion of the first and second segments.

Where the opposite side surfaces of one of first and second segments are used as joint surfaces and the other segments are held against and joined to the joint surfaces, since the other segments are arranged symmetrically with respect to the one of the first and second segments, they are prevented from being curved due to thermal stresses developed therein when they are joined to each other.

One of the first and second segments that are joined to each other project beyond the other segment at an end of the groove or the space where the melted glass flows in. The projecting portion of the one of the first and second segments can be used to support glass stuff placed on the end of the groove or the space. If the projecting segment is the first segment of ferrite, then the softened glass is prevented from being deposited on the end of the first segment and from cracking the first segment.

If the spacer is made of the same material as the first or second segment, the coefficient of thermal expansion of the spacer is the same as that of the first or second segment. If the nonmagnetic ceramics comprises ceramics composed mainly of CaTiO$_3$, then because its coefficient of thermal expansion is close to that of ferrite, thermal stresses developed in the ferrite and the nonmagnetic ceramics are reduced.

A magnetic head according to the present invention has a trailing core and a leading core that are joined to each other through a magnetic gap, the tailing core comprising a composite composed of a magnetic segment and a nonmagnetic segment, the magnetic and nonmagnetic segments having joined joint surfaces having an end face which is closer to a slidable surface and is positioned at a side surface of the trailing core other than the slidable surface, with only the magnetic segment exposed on the slidable surface. The magnetic head core is thus of a low inductance to make the magnetic head suitable for handing signals of higher frequencies. The trailing core has a large overall thickness for increased mechanical strength. Any edge of the joint surfaces of the magnetic and nonmagnetic segments does not read signals recorded on a recording medium, so that no readout error is caused.

Where the end face of the joint surfaces or the boundary layer of the magnetic and nonmagnetic segments which is closer to the sliding surface is positioned at a position other than a track forming region of the trailing core, only the magnetic·segment may be machined to produce a track, with the joint surfaces of the composite being not machined. Therefore, the track is prevented from being cracked or chipped. As a result, the track can easily be machined. The magnetic head thus fabricated has its track machined with high accuracy. Such an arrangement is particularly effective for a composite magnetic head where a long thin track is formed by machining.

The methods according to the present invention can easily manufacture a magnetic head which has a trailing core and a leading core that are joined to each other through a magnetic gap, the tailing core comprising a composite composed of a magnetic segment and a nonmagnetic segment, the magnetic and nonmagnetic segments having joined joint surfaces or a boundary layer having an end face which is closer to a slidable surface and is positioned at a side surface of the trailing core other than the slidable surface, with only the magnetic segment exposed on the slidable surface.

If the magnetic segment is made of Mn—Zn ferrite, then the magnetic head exhibits excellent characteristics. If the nonmagnetic segment is made of ceramics composed mainly of calcium titanate, then cracks are prevented from being developed when a composite composed of such magnetic and nonmagnetic segments is fabricated.

Where an Mn—Zn ferrite segment and a ceramics segment composed mainly of calcium titanate are joined to each other by a glass layer having a softening point of 600° C. or higher and a thickness ranging from 10 µm to 50 µm, it is possible to prevent cracks from being developed when a composite that comprises an Mn—Zn ferrite segment and a ceramics segment composed mainly of calcium titanate is fabricated. Furthermore, when a trailing core comprising an Mn— Zn ferrite segment and a ceramics segment composed mainly of calcium titanate is joined to a leading core, the glass in the joined region of the Mn—Zn ferrite segment and the ceramics segment is prevented from being softened.

Although certain preferred embodiments of the present invention has been shown and described in detail, it should be understood that various changes and modifications may be made therein without departing from the scope of the appended claims.

What is claimed is:

1. A method of manufacturing a composite for a magnetic head, said composite including a first segment of Mn—Zn ferrite, a second segment of nonmagnetic ceramic, and a glass layer which joins the first and second segments to each other, the method comprising the steps of:

defining a groove in a surface of at least one of the first and second segments, said groove extending from an upper end to a lower end of said at least one of the first and second segments, for receiving therein said glass layer;

holding the surfaces of said first and second segments against each other, at least one of which has said groove defined therein;

placing glass stuff at one end of said groove; and softening said glass stuff to cause the same to flow into said groove from said one end thereof, thereby forming said glass layer in said groove.

2. A method according to claim 1, further comprising the step of:

positioning one of said first and second segments so as to project beyond the other of said first and second segments at an end of said groove where the softened glass stuff flows in.

3. A method according to claim 2, wherein said one of said first and second segments is the first segment.

4. A method according to claim 1, wherein said nonmagnetic ceramic consists essentially of CaTiO$_3$.

5. A method according to claim 1, wherein said glass stuff is fiberglass.

6. A method according to claim 1, further comprising the step of:

placing said first and second segments vertically on a porous body, so that when the softened glass stuff flows into said groove air bubbles contained in the softened glass stuff can pass from lower ends of said first and second segments through said porous body.

7. A method according to claim 6, further comprising the step of:

tilting said first and second segments when the glass stuff is placed on said one end of said groove.

8. A method of manufacturing a composite for a magnetic head, said composite including first and third segments of Mn—Zn ferrite, a second segment of nonmagnetic ceramic, and a pair of glass layers which join the first and third segments to opposite surfaces of the second segment, respectively, the method comprising the steps of:

defining a groove in each of opposite surfaces of the second segment, each groove extending from an upper end to a lower end of the second segment for receiving therein each of said pair of glass layers; and holding the surfaces of said first and third segments against said both surfaces of the second segment, respectively;

placing glass stuff on said upper end of the second segment; and softening said glass stuff to cause the same to flow into said grooves from respective upper ends thereof, thereby forming said glass layers in respective said grooves.

9. A method according to claim 3, further comprising the step of:

positioning said first and third segments so as to project beyond the second segment at respective ends on the same side of said groove where the softened glass stuff flows in.

10. A method of manufacturing magnetic head, comprising the steps of:

defining a groove in one surface of a first segment of a magnetic material;

placing a second segment of a nonmagnetic material in said groove, said second segment having side and bottom surfaces spaced respectively from side and bottom surfaces of said groove;

flowing glass into a space between the surfaces of said groove and said second segment for thereby joining said first and second segments with the glass, to produce a composite including said first segment and said second segment placed in said groove and joined to said first segment; and joining a leading core segment to an opposite surface of said first segment remote from said one surface thereof.

11. A method according to claim 10, wherein said magnetic material is Mn—Zn ferrite and said nonmagnetic material is a ceramic consisting essentially of calcium titanate.

12. A method according to claim 11, wherein the glass which joins said first and second segments to each other has a softening point of 600° C. or higher and a thickness ranging from 10 µm to 50 µm.

* * * * *